(12) United States Patent
Makhija et al.

(10) Patent No.: US 11,880,781 B2
(45) Date of Patent: Jan. 23, 2024

(54) AUTONOMOUS SOURCING AND CATEGORY MANAGEMENT

(71) Applicant: NB Ventures, Inc., Clark, NJ (US)

(72) Inventors: Subhash Makhija, Westfield, NJ (US); Aditi Asthana, Mumbai (IN); Santosh Ganesh Dattatraya Bhat, Wadala East (IN); Vanamali Porethi, Telangana (IN)

(73) Assignee: NB Ventures, Inc., Clark, NJ (US)

( * ) Notice: Subject to any disclaimer, the term of this patent is extended or adjusted under 35 U.S.C. 154(b) by 577 days.

(21) Appl. No.: 16/938,112

(22) Filed: Jul. 24, 2020

(65) Prior Publication Data
US 2022/0027826 A1    Jan. 27, 2022

(51) Int. Cl.
*G06Q 10/0637* (2023.01)
*G06F 40/40* (2020.01)
(Continued)

(52) U.S. Cl.
CPC ..... *G06Q 10/06375* (2013.01); *G06F 16/285* (2019.01); *G06F 40/40* (2020.01); *G06N 5/04* (2013.01); *G06N 20/00* (2019.01); *G06Q 10/04* (2013.01); *G06Q 10/067* (2013.01); *G06Q 10/0635* (2013.01); *G06Q 10/06315* (2013.01);
(Continued)

(58) Field of Classification Search
CPC ............. G06Q 10/06375; G06Q 10/04; G06Q 10/06315; G06Q 10/0635; G06Q 10/06393; G06Q 10/067; G06Q 10/103; G06Q 30/0185; G06Q 30/0201; G06Q 30/0203; G06Q 50/188; G06Q 50/28; G06F 16/285; G06F 40/40; G06F 40/30; G06N 5/04;
(Continued)

(56) References Cited

U.S. PATENT DOCUMENTS

2007/0087756 A1 *  4/2007  Hoffberg .......... G06Q 10/06375
                                                            455/450
2008/0177994 A1 *  7/2008  Mayer ..................... G06F 16/00
                                                            709/224
(Continued)

FOREIGN PATENT DOCUMENTS

CN          101923669 A    * 12/2010
CN          109690606 A    *  4/2019   ......... G06Q 10/0635
(Continued)

OTHER PUBLICATIONS

G. Shankaranarayanan, "Managing Accuracy of Project Data in a Distributed Project Setting", 2010, Babson College, pp. 1-15. (Year: 2010).*
(Continued)

*Primary Examiner* — Tan D Nguyen
(74) *Attorney, Agent, or Firm* — BrownWinick Law Firm; David M. Breiner

(57) ABSTRACT

The present invention discloses a method, a system and a computer program product for Autonomous sourcing and Category management. The invention includes demand sensing and generation through a category workbench interface providing actionable insights for sourcing operation. The invention includes an AI engine configured for recommending a sourcing strategy through prediction analysis and auto negotiation in sourcing operation of Supply chain.

32 Claims, 20 Drawing Sheets

(51) Int. Cl.
*G06Q 10/0631* (2023.01)
*G06Q 30/0203* (2023.01)
*G06Q 30/0201* (2023.01)
*G06Q 30/018* (2023.01)
*G06Q 50/18* (2012.01)
*G06Q 10/04* (2023.01)
*G06Q 10/067* (2023.01)
*G06Q 50/28* (2012.01)
*G06Q 10/0635* (2023.01)
*G06Q 10/10* (2023.01)
*G06Q 10/0639* (2023.01)
*G06N 20/00* (2019.01)
*G06N 5/04* (2023.01)
*G06F 16/28* (2019.01)

(52) U.S. Cl.
CPC ..... *G06Q 10/06393* (2013.01); *G06Q 10/103* (2013.01); *G06Q 30/0185* (2013.01); *G06Q 30/0201* (2013.01); *G06Q 30/0203* (2013.01); *G06Q 50/188* (2013.01); *G06Q 50/28* (2013.01)

(58) Field of Classification Search
CPC ........ G06N 20/00; G06N 3/045; G06N 3/088; G06N 5/025
See application file for complete search history.

(56) References Cited

U.S. PATENT DOCUMENTS

| | | | | |
|---|---|---|---|---|
| 2010/0235285 | A1* | 9/2010 | Hoffberg | G06Q 50/188 705/37 |
| 2010/0317420 | A1* | 12/2010 | Hoffberg | G06Q 30/0282 463/1 |
| 2012/0052930 | A1* | 3/2012 | McGucken | A63F 13/47 463/1 |
| 2018/0264347 | A1* | 9/2018 | Tran | H04Q 9/00 |
| 2019/0171438 | A1* | 6/2019 | Franchitti | G06N 20/00 |

FOREIGN PATENT DOCUMENTS

| | | | | |
|---|---|---|---|---|
| CN | 109844793 A | * | 6/2019 | ............... G06N 5/02 |
| WO | WO-2012150602 A1 | * | 11/2012 | ............. G06Q 50/01 |
| WO | WO-2017147525 A1 | * | 8/2017 | ......... H04L 63/1408 |

OTHER PUBLICATIONS

Farzad Shafiei, "Multi-Enterprise Collaborative Enterprise Resource Planning and Decision Support Systems", 2004, IEEE, pp. 1-10 (Year: 2004).*

Victoria Benson, "Language Workbench User Interfaces for Data Analysis", 2015, PeerJ, pp. 1-17. (Year: 2015).*

Alexandra Mihalache, "Project Management Tools for Agile Teams", 2017, Informatica Economical, vol. 21, No. Apr. 2017, pp. 85-93. (Year: 2017).*

Rajendra Prasad, "Intelligent Autonomous Systems for Software Engineering—An example," 2018, International Conference on Intelligent Autonomous Systems, pp. 111-115. (Year: 2018).*

Mohammad Nuruzzaman, "A Survey on Chatbot Implementation in Customer Service Industry Through Deep Neural Networks," 2018, 2018 IEEE 15th International Conference on e-Business Engineering, pp. 54-61. (Year: 2018).*

* cited by examiner

| SUPPLIER_N AME_NORM | Orgs catered to | TOTAL_S PEND | No of transactions | Rating (0-5) | Risk rating (0-5) | Diversity | Rank |
|---|---|---|---|---|---|---|---|
| S1 | 3 | 5.22E+08 | 931246 | 5 | 1 | 1 | 1 |
| S2 | 2 | 5.22E+08 | 931246 | 3.2 | 2 | 0 | 2 |
| S3 | 1 | 5.22E+08 | 931246 | 2.1 | 3.2 | 1 | 3 |
| S4 | 2 | 194944668 | 88265 | 4.7 | 2.3 | 0 | 4 |
| S5 | 1 | 1.22E+09 | 322177 | 5 | 3.5 | 0 | 5 |
| S6 | 2 | 7820364 | 11679 | 3.9 | 3.5 | 0 | 6 |
| S7 | 1 | 80139582 | 1584187 | 3.1 | 3.7 | 0 | 7 |
| S8 | 2 | 177029.4 | 1182 | 4.4 | 2.9 | 1 | 8 |
| S9 | 1 | 5993145 | 453816 | 3.6 | 3.5 | 1 | 9 |
| S10 | 1 | 34417563 | 13221 | 4.4 | 2.1 | 0 | 10 |

| ID | Level 1 | Level 2 | Level 3 | Level 4 |
|---|---|---|---|---|
| 1 | MRO | MRO Supplies | Electrical | Regulators/ Converters/ Inverters |
| 2 | MRO | MRO Supplies | Industrial Supplies | Metal Products |
| 3 | MRO | MRO Supplies | Industrial Supplies | Metal Products |
| 4 | MRO | MRO Supplies | Industrial Supplies | Other Industrial Supplies |
| 5 | MRO | MRO Supplies | Power Transmission and Bearing | Gears/ Gear Units/ Reducers |

FIG. 3D

| S. No | General Ledger Description | Invoice Description | Material Description |
|---|---|---|---|
| 1 | Minor machinery and equipment | VABF-S4-1-R1C2-C-6 Regulator Plate | Maintenance parts and supplies: Pneumatic Parts |
| 2 | Capital Expenditure to Project | 10inch Clevis hanger | Plant, property and equipment: Extrusion equipment |
| 3 | Capital Expenditure to Project | Steel for greige roll gravity racks | Plant, property and equipment: Tire racks |
| 4 | Factory Supplies | TK4650660T 0-6 range stainless steel Inc | Maintenance parts and supplies: General industrial supplies |
| 5 | Outside Contracts for R&M | Insulate piping in millroom | Contractors and services: General maintenance contractors |

FIG. 3E

| Label 5 (Item) | label1 | label2 | label3 | label4 |
|---|---|---|---|---|
| Guard fan | MRO | MRO SUPPLIES | MRO SUPPLIES | PLASTIC GUARD |
| Car mfg stamping project | MRO | MRO SUPPLIES | ELECTRONICS AND INSTRUMENTATION | ELECTRONIC HARDWARE EQUIPMENT, OTHER |
| Cdx | MRO | MRO SUPPLIES | ELECTRONICS AND INSTRUMENTATION | ELECTRONIC HARDWARE EQUIPMENT, OTHER |
| Inst butte roadid gerhard westerheiten | MRO | MRO SUPPLIES | ELECTRONICS AND INSTRUMENTATION | ELECTRONIC HARDWARE EQUIPMENT, OTHER |
| Matt minnick | MRO | MRO SUPPLIES | ELECTRONICS AND INSTRUMENTATION | ELECTRONIC HARDWARE EQUIPMENT, OTHER |
| Stencil | MRO | MRO SUPPLIES | ELECTRONICS AND INSTRUMENTATION | ELECTRONIC HARDWARE EQUIPMENT, OTHER |
| Bns fiber sff | MRO | MRO SUPPLIES | ELECTRICAL | SPLICE CLOSURE |
| Closure | MRO | MRO SUPPLIES | ELECTRICAL | SPLICE CLOSURE |
| Closure copper transition empty ctc line | MRO | MRO SUPPLIES | ELECTRICAL | SPLICE CLOSURE |
| Closure ped kit | MRO | MRO SUPPLIES | ELECTRICAL | SPLICE CLOSURE |
| Closure pedestal inch | MRO | MRO SUPPLIES | ELECTRICAL | SPLICE CLOSURE |
| Closure splice | MRO | MRO SUPPLIES | ELECTRICAL | SPLICE CLOSURE |
| Dead end medium cable two layer adss | MRO | MRO SUPPLIES | ELECTRICAL | SPLICE CLOSURE |
| Fosc acc | MRO | MRO SUPPLIES | ELECTRICAL | SPLICE CLOSURE |
| Grommet silicone inch | MRO | MRO SUPPLIES | ELECTRICAL | SPLICE CLOSURE |

AUTONOMOUS SOURCING AND CATEGORY MANAGEMENT

BACKGROUND

1. Technical Field

The present invention relates generally to autonomous Sourcing in supply chain. More particularly, the invention relates to systems, methods and computer program product for autonomous sourcing and category management in supply chain.

2. Description of the Prior Art

Supply chain management professionals are tasked with managing humongous volumes of data and stakeholders across multiple systems, all while trying to build and execute a high performing and resilient strategy. It has become humanly impossible to gather all the resources and stay on top of all the information floating around, let alone analyzing it to draw meaningful insights or make informed decisions.

Procurement as part of Supply chain function, is essential as it impacts and manages organizational spend. If an organization does not have a strategic approach to its procurement needs whether it be procurement for business continuity e.g. inventory purchasing, or procuring for business support e.g. IT, the spending can get out of control and become damaging.

Organizations invest a lot in acquiring skilled Sourcing Managers and Category Managers who spend tremendous amount of time today to perform key activities like arriving at category plans, positioning and segmentation, creating & executing strategy execution plans, manage category performance, drive category governance and manage stakeholder expectations.

Dependency on Category managers is high to undertake strategic approach to procurement, where the organization segments its spending on goods and services in different category as part of category management. The segmentation arranges goods and services in discrete groups depending on the functions of these goods and services. Some of the categories include office management, HR, Professional Services, Security, IT, Transport, travel, medical, industrial products and services etc.

Category management relies on efficient analysis of organizational strategic goals and sourcing. Certain factors like Updated pricing analysis on local and international markets, and the prevailing trends, Supplier performance data, analysis of any saving gained through negotiations, substitution and compliance, an updated analysis of organizational spend in comparison to market data as well as identifying Key performance indicators for determining areas of improvement, are extremely essential and quantifying data associated with such factors for assessment by category managers is not possible.

Further, the problem of availing data for carrying out the tasks and making decisions has been replaced with delivery of accurate, clean and timely information in a structured and sophisticated manner. In addition to that, if the domain of information is large like in case of supply chain, different users will have the requirement of slicing and dicing the data according to specific needs of the Category.

Recognizing the demand for materials or services before it arises and having a good sense of inventory with contractual agreements can help set the pace. The key here is structured and unstructured information that can help define the scope and baseline. While there are several methods and systems that deal with structured and unstructured data, the approach required for a Supply chain related Sourcing process is considerably different due to the unknowns. Sourcing and category management process involves analysis of data with considerable difference in the variance levels itself. Since, the number of parameters to be factored in these processes itself changes dynamically, the reliance on human assessment at multiple levels is also risky. Even when computing systems and its processing capabilities are used, the results are inaccurate due the underlining uncertainty about the information being processed. While, the techniques for automated processes are obsolete, less accurate and time consuming, processing of certain parameters to ensure efficient sourcing and category management are never considered.

In view of the above problems, there is a need for system and method of data processing for sourcing and category management in supply chain that can overcome the problems associated with the prior arts.

SUMMARY

According to an embodiment, the present invention provides a method of autonomous sourcing in supply chain management. The method includes receiving a demand from at least one data source, triggering a sourcing module through a category workbench user interface for initiating at least one task based on the received demand, processing by an AI engine coupled to a processor, a plurality of historical data from a data lake based on one or more data models to generate code for a recommended strategy through prediction analysis, injecting by an intelligent bot, aggregated data patterns related to one or more object categories into the recommended sourcing strategy for generating at least one object characteristic data set. The method also includes identifying one or more suppliers for executing the recommended strategy based on the object characteristic data set; and encapsulating one or more recommended awarding scenario on the category workbench user interface for selection. The method includes receiving a response to a questionnaire based on the object characteristic data set from one or more recommended suppliers for identifying the one or more suppliers. The questionnaire is generated by the AI engine configured to process a historical query knowledge database based on a plurality of parameters and the object characteristic data set. The method also includes the step of injecting by a bot, one or more impact parameters capable of modifying at least one of the actionable insights, the recommended strategy, the data patterns or the awarding scenario. Further, the method includes recommending a negotiation strategy through an auto-negotiator based on a negotiation script generated by the AI engine wherein the awarding scenario is encapsulated based on execution of the negotiation strategy.

In an embodiment the bot is configured to generate backend scripts based on the recommended strategy for injecting the aggregated data using AI based dynamic processing logic to generate the object characteristic data set.

In an embodiment, the present invention includes a system for sourcing in supply chain management. The system includes a category workbench application user interface configured for triggering a sourcing module to initiate at least one task based on a received demand from at least one data source, an AI engine coupled to a processor and configured for processing a plurality of historical data from a data lake based on one or more data models to generate code for a recommended strategy through prediction analysis, a data model database for storing one or more data models configured for generating the recommended strategy through prediction analysis and aggregated data patterns related to one or more object categories, and a controller encoded with instructions enabling the controller to function as a bot for injecting the data patterns into the recommended strategy for generating at least one object characteristic data set, wherein the processor is configured to process the object characteristic data set to identify one or more suppliers for executing the recommended strategy, wherein one or more recommended awarding scenario is encapsulated on the category workbench application user interface by the bot for selection.

In an embodiment, the present invention provides a Category management system for supply chain operations. The system includes a category workbench application user interface configured to generate a plurality of data patterns related to one or more object categories for providing actionable insights to a user through at least one dashboard of the interface, an intelligent bot configured for injecting the data patterns into at least one recommended strategy for generating at least one object characteristic data set. The system includes a processor configured to process historical data from a data lake and the object characteristic data set to identify one or more suppliers for executing the recommended strategy, wherein the actionable insight includes a set of qualitative and quantitative data generated by processing of historical data from a data lake to analyze trends in supply chain for enabling execution of at least one task.

In an embodiment, the present invention provides a category workbench application user interface configured to provide the actionable insights into the one or more data patterns being selectable to trigger an application associated with each of the one or more data patterns and enable the selected data pattern to be seen within the application and providing details on spend category, supplier regions spend, actual/vs target spend, top cost drivers and strategies.

In an embodiment, the invention provides a method of Category management for supply chain operations. The method includes generating a plurality of data patterns related to one or more object categories for providing actionable insights to a user through at least one dashboard of a category workbench application user interface, injecting by an intelligent bot, the data patterns related to one or more object categories into a recommended strategy for generating at least one object characteristic data set. The method includes the step of processing historical data from a data lake and the object characteristic data set to identify one or more suppliers for executing the recommended strategy and generating a set of quantitative and qualitative data on the dashboard to analyze trends in supply chain for enabling execution of at least one task initiated by a user through the interface.

In an embodiment, the category management method includes initiating automated tactical execution process based on the recommended strategy wherein the recommendation is auto-flipped into projects with a pre-populated responsibility assignment matrix, a savings target, one or more impacted categories and a supplier data.

In another embodiment the category management method includes encapsulating one or more awarding scenario on the category workbench application user interface by the bot wherein an AI engine incorporates rules and target constraints including preferable number of suppliers, preferential awards to incumbent suppliers, minimum lead times, and savings goals to automatically arrive at a most efficient cost for executing recommended strategy.

In yet another example embodiment, the data patterns include pricing and specification information for target pricing, constraints related to one or more object categories etc.

In an exemplary embodiment, the object categories include category of items or service such as office supplies for tables or chairs, IT equipment for laptop or processor etc.

In an embodiment, the present invention provides a computer program product for Sourcing and category management. The product includes a computer readable storage medium readable by a processor and storing instructions for execution by the processor for performing sourcing and category management method in supply chain.

In an advantageous aspect, the system and method of the present invention provides ability to overlay pieces of the structured data to arrive at actionable insights. Also, enables setup of automated ongoing sourcing and category management processes based on the nuanced category requirements. Like, automatic curation of a souring demand through a demand aggregation algorithm, identification of appropriate baseline through price benchmarking, down listing suppliers & launching the sourcing event, automatic screening of responses, auto-identifying best fit scenarios for the given event to recommend awarding decision and ongoing monitoring of supplier and contract related risk through the workbench. Further the system of the invention configures and receives alerts on a periodic basis to review progress and make modifications or course corrections which help the system identify patterns specific to the category and enhance the automation flow through machine learning systems.

In an advantageous aspect, the present invention utilizes Machine Learning algorithms, prediction data models, recommendation algorithms, qualitative and quantitative data analysis.

BRIEF DESCRIPTION OF THE DRAWINGS

The disclosure will be better understood and when consideration is given to the drawings and the detailed description which follows. Such description makes reference to the annexed drawings wherein:

FIG. 3B is a table showing supplier score and ranking for the example scenario in accordance with an embodiment of the invention.

FIG. 3D shows a table providing attributes obtained from different data sources in accordance with an embodiment of the invention.

FIG. 3E shows a table showing label taxonomy in accordance with an embodiment of the invention.

FIG. 3K is a table showing item to category mapping in accordance with an embodiment of the invention.

FIG. 5D shows category workbench application user interface with insight into cost drivers in accordance with an embodiment of the invention.

DETAILED DESCRIPTION

Figure 1:
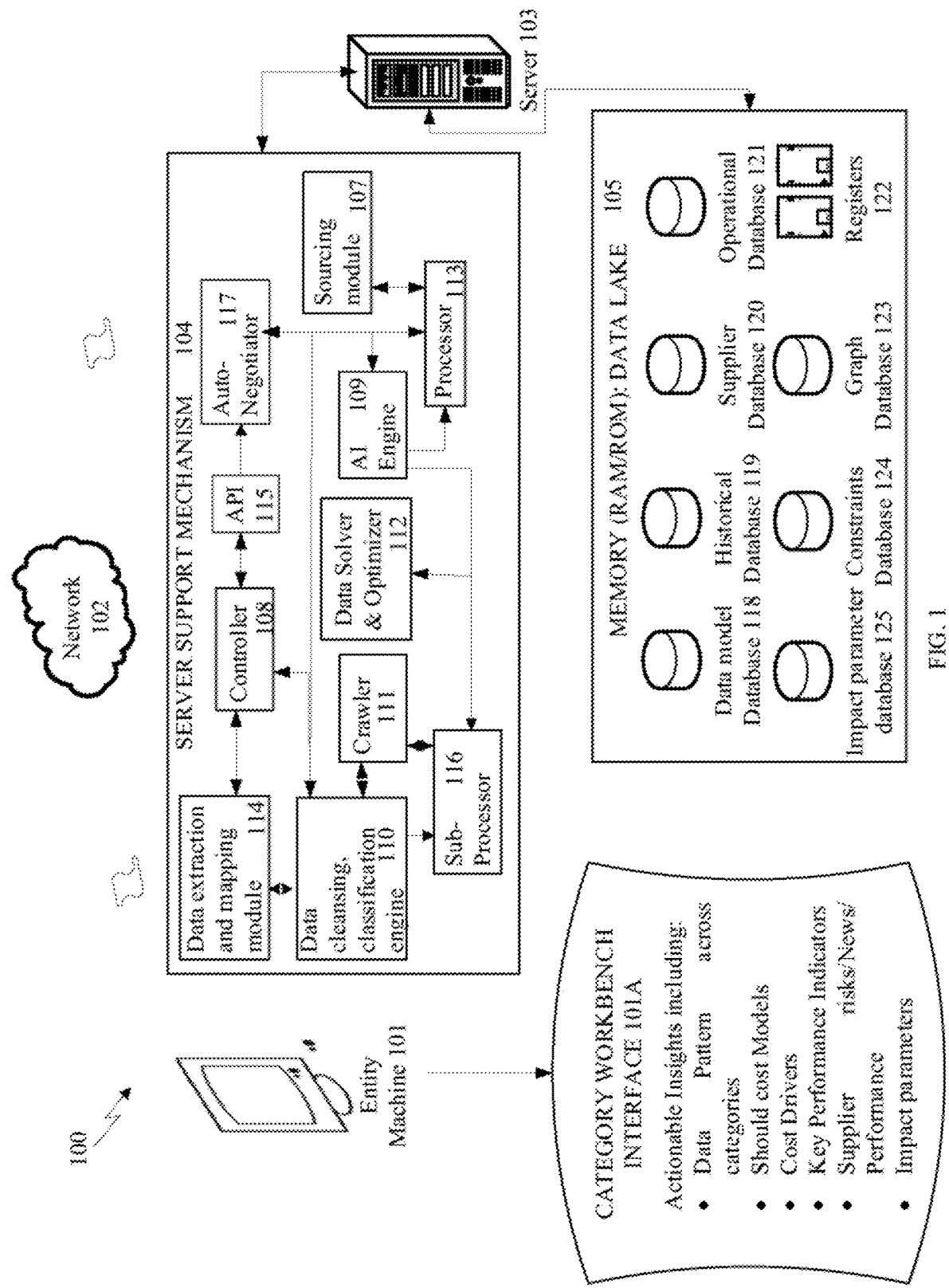
FIG. 1 is a view of a Sourcing and category management system in accordance with an embodiment of the invention.

Described herein are the various embodiments of the present invention, which includes method and system for sourcing and category management in supply chain.

The various embodiments including the example embodiments will now be described more fully with reference to the accompanying drawings, in which the various embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the sizes of components may be exaggerated for clarity.

It will be understood that when an element or layer is referred to as being "on," "connected to," or "coupled to" another element or layer, it can be directly on, connected to, or coupled to the other element or layer or intervening elements or layers that may be present. As used herein, the term "and/or" includes any and all combinations of one or more of the associated listed items.

Spatially relative terms, such as "constraints," "analysis," or "data lake," and the like, may be used herein for ease of description to describe one element or feature's relationship to another element(s) or feature(s) as illustrated in the figures. It will be understood that the spatially relative terms are intended to encompass different orientations of the structure in use or operation in addition to the orientation depicted in the figures.

The subject matter of various embodiments, as disclosed herein, is described with specificity to meet statutory requirements. However, the description itself is not intended to limit the scope of this patent. Rather, the inventors have contemplated that the claimed subject matter might also be embodied in other ways, to include different features or combinations of features similar to the ones described in this document, in conjunction with other technologies. Generally, the various embodiments including the example embodiments relate to a system and method for autonomous sourcing and category management in enterprise applications.

Referring to FIG. 1, a system 100 for sourcing and category management is provided in accordance with an embodiment of the present invention. The system 100 includes at least one entity machine 101 with category workbench user interface 101A for sending, receiving, modifying or triggering processing of category-based sourcing data over a network 102. The system includes a server 103 configured to receive data and instructions from the entity. The system 100 includes a support mechanism 104 for performing sourcing process with multiple functions including contract data extraction, classification and structuring of data attributes for analysis of data, creation of data models configured to process different parameters including supplier data, impact data, historical data etc. The system 100 includes a data lake 105 for accessing item or service related data from entities and storing plurality of training classification models created by support mechanism 105.

In an embodiment the server 103 of the invention may include various sub-servers for communicating and processing data across the network. The sub-servers include but are not limited to content management server, application server, directory server, database server, mobile information server and real-time communication server.

In an embodiment the entity machine 101 may communicate with the server 103 wirelessly through communication interface, which may include digital signal processing circuitry. Also, the entity machine 101 may be implemented in a number of different forms, for example, as a smartphone, computer, personal digital assistant, or other similar devices.

In an exemplary embodiment, the category workbench interface 101A of the entity machine 101 enables cognitive computing to improve interaction between user and the supply chain application(s). The Category workbench interface 101A improves the ability of a user to use the computer machine itself. Since, the category workbench 101A provides actionable insights into various category of information including but not limited to spend category, supplier regions spend, actual/vs target spend, top cost drivers, strategies, etc., at the same instant, the interface thereby enables a user to take informed decision or undertake an appropriate strategy. The category workbench application interface 101A triggers a plurality of predictive data models to identify one or more category of objects eligible for sourcing. By eliminating multiple layers, processing tasks and recordation of information to get a desired data or functionality, which would be slow, complex and impractical to learn, particularly to a user without deep knowledge of the subject, the category workbench 101A is more user friendly and improves the functioning of the existing computer systems.

In an example embodiment, the support mechanism 104 of the system 100 includes a control interface for accessing demand related information received at the server 103. The support mechanism further includes a sourcing module 107 triggered through the category workbench 101A of the entity machine 101 for initiating at least on task based on the received demand at the server 103.

The support mechanism 104 includes a verification engine for verifying/identifying if the demand request is received from an entity or triggered by the system after completion of an application function or auto generated. The mechanism 104 further includes a controller 108 encoded with instructions, enabling the controller 108 to function as a bot for autonomous sourcing and category management application operations. The mechanism 104 also includes an object specific data model mechanism (OSDM) as part of the data model database within entity specific data in the data lake 105. The object includes item or service for sourcing as a supply chain operation. The support mechanism 104 includes an AI engine 109 configured for enabling generation of a plurality of data script depending on the multiple data models like object specific data model, supplier recommendation data model etc. The mechanism 104 includes data cleansing and classification engine 110 for cleansing of data and categorization of objects, a crawler 111 for identifying relevant information from various sources including news feeds, contracts, supplier data on web etc., a data solver and optimizer 112 for processing variables, bid optimization and recommend suppliers. The data solver and optimizer 112 is configured for identifying constraint associated with suppliers before processing, a processor 113 configured for performing various functions including but not limited to selecting appropriate data attributes, identifying positioning of the data attributes, processing object related data based on multiple data models for recommending supplier in a sourcing operation etc. The AI engine 109 is coupled to the processor 113 for prediction of constraints and recommendation of supplier. The mechanism includes a data extraction and mapping module 114 configured for extracting and mapping object data to category and supplier by clustering script generated through the AI engine 109. The mechanism 104 includes an API 115 for triggering multiple data models through the processor 113 for carrying out the sourcing operation. Since supply chain operations include multiple functions within the sourcing operation like supplier recommendation, item categorization, demand sensing etc., the support mechanism 114 includes sub-processors 116 for carrying out multiple tasks simultaneously. Further, the sourcing operation includes tasks like supplier recommendation, bid optimization and negotiation with suppliers. The mechanism 104 includes an auto-negotiator 117 coupled to the AI engine 109 configured for negotiating with the supplier based on a negotiation script generated by the AI engine 109. The negotiator 117 processes information about suppliers, pricing, budget, market and bids. The negotiation script drives conversations with suppliers for negotiation.

In an exemplary embodiment, the AI engine 109 is coupled to the controller 108 encoded with instructions enabling the controller 108 to function as a bot for processing the sourcing request based on the parameters. The set of parameters include parameters that determine if the demand is generated after expiry of a contract or a demand directly by the entity etc., The parameters may include entity name, existing contract details, pricing information, object procured, date of procurement, place, etc. It shall be understood to a person skilled in the art that the parameters may vary depending on the request and source of request like from an entity or auto generated request from an application after completion of an operation of the application or generation of an auto-set demand trigger through the application.

In example embodiment the server 103 shall include electronic circuitry for enabling execution of various steps by the processor. The electronic circuitry has various elements including but not limited to a plurality of arithmetic logic units (ALU) and floating-point Units (FPU's). The ALU enables processing of binary integers to assist in formation of at least one table of data attributes where the OSDM and entity specific data model (ESDM) or either similar data models are applied to the data table for obtaining supplier score of recommending suppliers. In an example embodiment the server electronic circuitry includes at least one Athematic logic unit (ALU), floating point units (FPU), other processors, memory, storage devices, high-speed interfaces connected through buses for connecting to memory and high-speed expansion ports, and a low speed interface connecting to low speed bus and storage device. Each of the components of the electronic circuitry, are interconnected using various busses, and may be mounted on a common motherboard or in other manners as appropriate. The processor 113 can process instructions for execution within the server 103, including instructions stored in the memory or on the storage devices to display graphical information for a GUI on an external input/output device, such as display coupled to high speed interface. In other implementations, multiple processors and/or multiple busses may be used, as appropriate, along with multiple memories and types of memory. Also, multiple servers may be connected, with each server providing portions of the necessary operations (e.g., as a server bank, a group of blade servers, or a multi-processor system).

In an example embodiment, the system of the present invention includes a front-end web server communicatively coupled to at least one database server, where the front-end web server is configured to process the recommended strategy based on a plurality of scripts by receiving the recommended strategy processed by the server and applying an AI based dynamic processing logic to the strategy to automate at least one task.

The processor 113 may be implemented as a chipset of chips that include separate and multiple analog and digital processors. The processor 113 may provide coordination of the other components, such as controlling user interfaces, applications run by devices, and wireless communication by devices.

The Processor 113 may communicate with a user through control interface and display interface coupled to a display. The display may be, for example, a TFT LCD (Thin-Film-Transistor Liquid Crystal Display) or an OLED (Organic Light Emitting Diode) display, or other appropriate display technology. The display interface may comprise appropriate circuitry for driving the display to present graphical and other information to an entity/user. The control interface may receive commands from a user/category manager and convert them for submission to the processor. In addition, an external interface may be provided in communication with processor 113, so as to enable near area communication of device with other devices. External interface may provide, for example, for wired communication in some implementations, or for wireless communication in other implementations, and multiple interfaces may also be used.

In an embodiment, the present invention uses GPUs (Graphical processing units) for enabling AI to provide computing power to processes humongous amount of data.

In an exemplary embodiment, the Artificial intelligence engine 109 employs machine learning techniques that learn patterns and generate insights from the data. Further, the AI engine with ML employs deep learning that utilizes artificial neural networks to mimic biological neural network in human brains. The artificial neural networks analyze data to determine associations and provide meaning to unidentified data.

In another embodiment, the invention enables integration of Application Programming Interfaces (APIs) 115 for plugging aspects of AI into the sourcing application.

Referring to FIG. 1, the various elements like the support mechanism 104 and the data lake/memory data store 105 are shown as external connections to the server 103 in accordance with an embodiment of the invention. However, it shall be apparent to a person skilled in the art that these elements may be part to an integrated server system. Also, some of the sub-elements of the support mechanism 104 and the data lake/memory data store 105 either alone or in various combinations may be part of a server system as other external connections.

In an example embodiment, the data lake/memory data store 105 includes plurality of databases as shown in FIG. 1. The data store 105 includes a data model database 118 storing a plurality of data models relevant to the data attribute of objects for extracting object data from historical database 119, the historical database 119 stores transaction data including spend data, object data, contract data etc., from one or more entities, a supplier database 120 configured for storing supplier related data, an operational database 121 configured for storing a set of parameters identified from a received demand for initiating a sourcing request. The data model database includes an entity specific data model (ESDM) database, an object specific data model (OSDM) database and a data script database (DSD) configured for storing a plurality of data script generated by the AI engine based on analysis of the recommended sourcing strategy. The data script is generated based on prediction analysis, and deep learning performed on historical database 119 and entity specific historical database. The data script includes a set of queries processed by dynamically generated AI based processing logic. The data lake 105 further includes a plurality of registers 122 as part of the memory data store 105 for temporarily storing data from various databases to enable transfer of data by a processor between the databases as per the instructions of the AI engine 109 to create a strategy. Further, the data model database 118 is configured for storing a plurality of training data models required to fetch data attributes for creating a questionnaire based on sourcing request and identified strategy. The data lake 105 includes a graph database 123 configured for storing graphical data model where multiple criterion such as entity line of business and region of suppliers can also be used as additional filters to recommend the best possible list of suppliers. The data lake 105 includes a constraint database 124 configured for storing implicit and explicit constraints utilized for determining supplier score for recommending a supplier. The data lake also stores key performance indicator (KPI) information about suppliers based on information in the historical database 119 related to past contracts, execution and compliance with legal obligations under the contracts etc. The data lake 105 also includes an impact parameter database 125 storing real time updated information related to parameters impacting a sourcing decision or supplier recommendation.

In an embodiment, the system retrieves one or more recommended suppliers from the supplier database 120 based on a plurality of factors including financial performance and risk ratings, revenue details, financial stability, spend data, client servicing, logistics, lead times, market fragmentation, capacity constraints, certifications, incumbent status, currency fluctuations and political risks.

In an embodiment, the processing logic for identifying a recommended strategy or a recommended supplier or a negotiation strategy, is sequential or parallel or switching based processing of the data attributes for generating the data script to ensure faster processing of the request. The switching-based processing logic includes dynamic identification of a path for processing of the request based on the data script and determination of multiple data attributes dependent on each other.

In an embodiment, the recommended strategy is determined based on data points including evaluation of operational objectives, total Cost of Ownership and lifecycle, engagement and pricing models, compliance levels, analysis of historical policies and strategies, consumption patterns, behaviour and performance data, opportunities for consolidation of volumes across geographies, business units, product and service categories, volume tier discounts, new technologies, substitute products, low cost alternatives, standardization or reuse opportunities, benchmarks for resource qualifications and experience, intervals for price negotiations, futures, forwards, and options to fix or cap prices of commodity purchases in liquid markets, currency hedging for materials which are predominantly imported, Value chain for opportunities for Vertical integration, Should cost by leveraging data model to negotiate on billing rates, material and equipment price, supplier mark-up/profit, and current inventory management practices.

In an embodiment, the object specific data model (OSDM) is generated by analyzing the plurality of object data from the historical database 119 where the database 119 includes the plurality of object data extracted after optical character recognition of past executed contracts by one or more entities. The system further analyzes historical data through the workbench application interface and perform AI based budget predictions and demand aggregation by overlaying a historical spend data with disparate forecasting models built on various data sources available to analyze spend and pricing trends for the object.

The AI engine 109 predicts and recommends suppliers by processing supplier information in the supplier database 120 and past contract related information in historical database 119 to provide supplier score and ranking. The system 100 also includes an authentication mechanism to ensure each recommended supplier is validated automatically, thereby saving time and increasing security.

The memory data store 105 may be a volatile, a non-volatile memory or memory may also be another form of computer-readable medium, such as a magnetic or optical disk.

The memory store 105 may also include storage device capable of providing mass storage. In one implementation, the storage device may be or contain a computer-readable medium, such as a floppy disk device, a hard disk device, an optical disk device, or a tape device, a flash memory or other similar solid-state memory device, or an array of devices, including devices in a storage area network or other configurations.

The computing devices referred to as the entity machine, server, processor etc. of the present invention are intended to represent various forms of digital computers, such as laptops, desktops, workstations, personal digital assistants, and other appropriate computers. Computing device of the present invention further intend to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this disclosure.

In an embodiment, the system is provided in a cloud or cloud-based computing environment. The autonomous sourcing and category management system enables more secured process considering the issues inherent with cloud environments.

In an embodiment, the entity or user includes a client, a category manager, one or more operation of an Enterprise application automatically generating the sourcing demand request based on execution of the operation like expiry of an existing contract, direct sourcing request or occurrence of any such operation triggering the application to generate the demand or request.

In an exemplary embodiment, the autonomous sourcing and category management system 100 of the present invention is configured for analyzing impact of a plurality of varying parameters (changes in pricing, supply demand) on sourcing decisions factors to predict the sourcing strategy. The varying parameters include market dynamics and internal spend drivers across suppliers, parts, products, commodities, and business units/plants across various Regions. The invention evaluates leading indicators in the market applicable for the Category in conjunction with correlated factors to provide predictions on changes in material costs, product margins, supply constraints, supplier financial risk, etc. to enable proactive procurement decisions. These decisions will avoid cost pressures, minimize new risks, or lock-in savings to eventually recommend strategies to be executed through the category workbench 101A.

Figure 2:
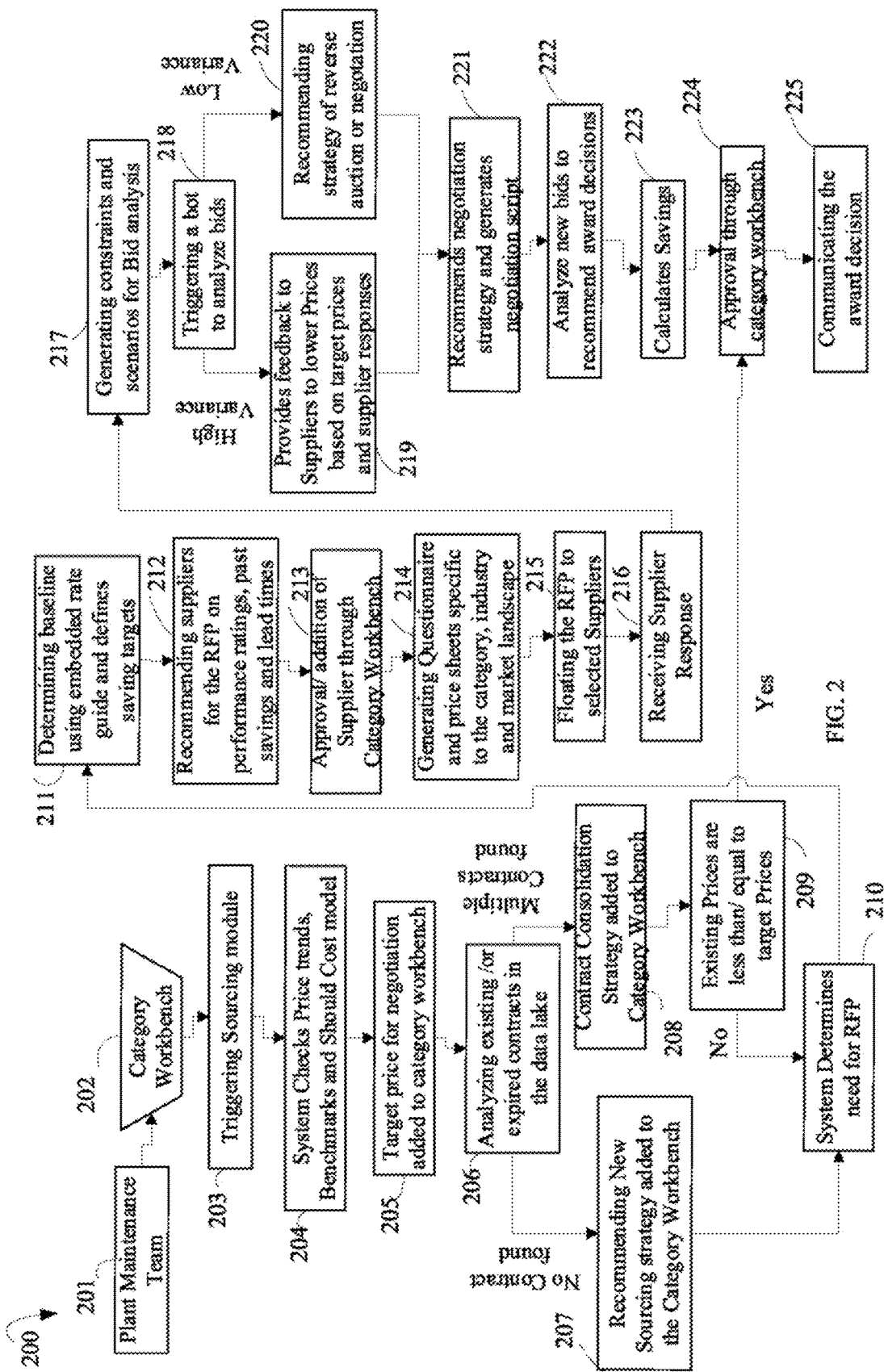
FIG. 2 is a flowchart depicting a method of sourcing and category management in accordance with an embodiment of the invention.

Referring to FIG. 2, a flowchart 200 depicting a method of sourcing and category management is provided in accordance with an embodiment of the present invention. The method includes the steps of 201 receive a demand from a data source such as a plant maintenance team, through expired contracts etc. at a server. In step 202 a category workbench receives information related to the demand and in 203 a sourcing module is triggered on the category workbench application interface for initiating at least one task. In step 204 the system checks price trends and should cost models for analysis. In step 205, a target price is added to the workbench for negotiation. In step 206, existing or expired contracts in the data lake are analyzed. In step 207, if no contracts are found then recommending new strategy to be added to the workbench. In step 208, if multiple contracts are found then, contract consolidation strategy is added to the workbench. In step 209, checking if existing prices are less than or equal to target prices. In step 210, determining a need for an RFP if the existing prices are more than target prices. In step 211, determining baseline using embedded rate guide and defining saving targets. In step 212, recommending suppliers for the RFP on performance ratings, past savings and lead times. In step 213 approving or adding supplier through workbench, and in 214 generating questionnaire and price sheets specific to the category, industry and market landscape. For executing the method, AI engine coupled to the controller enables the controller to function as a bot to create Price sheet for bids with target price for each object, identifies and inject implicit or explicit constraints such as constraint on Volume, Delivery, region etc. The bot also creates a questionnaire for object categories and recommends suppliers through processing of historical data, impact parameters and response received to the questionnaire. The AI engine enables creation of data scripts for processing multiple tasks including generation of relevant questionnaire, supplier recommendation, optimization, and object characteristic data set. In step 215 floating the RFP to selected suppliers and receiving supplier response in 216. In step 217, generating constraints and scenarios for bid analysis. In step 218, triggering a bot to analyze bids, where in case of high variance, providing feedback to suppliers to lower prices based on target prices and supplier responses in 219. In step 220, recommending strategy of reverse auction or negotiation in case of low variance i.e the bids are close. In step 221, recommending negotiation strategy and generating negotiation script. In step 222, analyzing new bids to recommend award decisions and in step 223, calculating savings. In step 210, if it is determined that the existing prices are less than or equal to the target price then in step 224 approving the pricing through category workbench. In step 225, communicating the award decision.

If the autonomous sourcing method and system determines significant cost saving then with reference to steps 211-214 above, a bot creates object characteristic data sets such as price sheets for RFX (bids) with target prices for each item, constraints such as volume, delivery, regions etc., and generates questionnaire by AI based processing of item/service categories. Depending on the number of suppliers, a decision on bidding or creation of RFX is taken. For E.g., If number of participating suppliers is less than 4 and auction is triggered, else a sourcing event in RFX is initiated. The participating Suppliers respond to the questionnaire and price sheet information, and a dynamic feedback/bidding process is initiated. As part of the bidding process, once the target prices are met and the auto bid optimization recommends allocation of item/services across different suppliers an auto generated consent terms and conditions is triggered and sent the suppliers for acceptance.

In an embodiment, the invention examines the bids against the target prices and average. It gives feed to suppliers on prices in terms of their position and variance from the average and lowest bids.

In an example embodiment, the at least task includes processing should cost models, trends of raw materials, price benchmark of objects etc., for providing actionable insights on the application interface.

In another example embodiment, the recommended strategy includes, auto renewal of existing contract, initiation of sourcing event with RFx, auction or bids etc. These strategies are based on the actionable insights. It is understood to a person skilled in the art that RFx refers to documents including but not limited to request for Proposal (RFP), request for information (RFI), request for Quote (RFQ) etc.

In an embodiment the identification of suppliers for awarding the sourcing contract includes evaluation of parameters associated with at least one of supplier management operations, procurement operations, inventory management operations, account payable operations, transportation management operations, and material management operations.

In an embodiment, the data sources include expiring contracts, blanket pay orders, should cost models built on market indices and prices, transactional spend data, demand planning, ERPs, budgets, supply planning, newsfeeds, Merger and Acquisition information, bankruptcy, innovation and spin-off.

In an example embodiment, the demand is sensed through a plurality of data sources like the system triggers order for object but determines all quantity against the contract has been used. The system identifies that inventory level for the object is about to reach safety sock and the plant needs to place and order quickly to account for the lead time. The demand may also be generated if an organization is opening a new plant as a part of the expansion plan. Also, depending on the market conditions the system may predict and increase in demand for an item, therefore, organization needs to produce more by utilizing more capacity of existing plants, since more lines will be operational, more inventory is needed.

In an example embodiment, for determining a target price the system after checking with price benchmarks and should cost models, determines that the DDP (Delivered Duty Paid) price for the object should be 0.50 USD/lbs-0.65 USD/lbs.

In an example embodiment, when the system determines there are no active contracts for an object/item, it recommends a new sourcing strategy like combination of low-cost country sourcing and buying recycled object etc.

In another example embodiment, from the current prices paid and volumes, the system determines a baseline price of 0.72 USD/lbs, annual volume of 3,000 tonnes, and baseline spend of USD 4.76 MM, therefore, the expected savings are: USD 0.46-1.46 MM.

In an example embodiment, as part of the recommended strategy, the system analyzes multiple contracts with different suppliers of item/object for a particular plant/location. The system adds this to the list of criteria for recommending sourcing strategy. In some of the contracts, the price is within the system recommended range and the systems recommends through the category workbench to consolidate supply with these suppliers and connect with them.

In an embodiment, after understanding the complexity of the category and supply chain complexities associated with say sourcing from low cost countries (e.g., long lead times) and risks and standards for recycled materials, the system auto-generates a questionnaire through a bot. The AI engine processes historical and standard RFPs for the category and the should cost models used depending on real-time changing market dynamics, to generate an object characteristic data set. The invention includes a historical query knowledge database configured for storing a plurality of questions processed by the AI engine based on a plurality of parameters and the object characteristic data set to generate a questionnaire where one or more suppliers are identified based on a response to the questionnaire received from one or more recommended supplier.

The historical query knowledge database is a question bank with a feedback loop. The AI engine keeps learning from the new questionnaire created every time and stores the questions in the bank. Depending on the demand and strategy the questionnaire is auto populated and sent to one or more suppliers for receiving a response. The set of questions fetched from the question bank are based on the requirement and may be influenced by certain impact parameters. The AI engine fetches the questions from the bank to create the questionnaire are based on a script generated by the bot for processing the requirement.

In an embodiment, as part of the negotiation strategy the system generates a script to further negotiate with the suppliers, e.g., falling prices of crude, additional volume discounts from volume consolidation, sign on bonus for incumbents, pricing formula to use, best payment terms etc. The negotiation script is generated based on one or more negotiation data models trained through natural language processing (NLP) of a historical dataset with logistic regression and median calculations to predict recommendations. Further, the recommendations predict one or more optimum negotiation approach and most effective negotiation parameters.

In an exemplary embodiment the invention includes auto contract creation with legal and commercial terms and conditions based on the selected awarding scenario after negotiation. Further, the invention includes risk assessment associated with source to contract at various stages of the processes.

The system is configured to determine an objective function for selecting suppliers to minimize spend. The system automatically generates award scenarios, such as lowest bid, max 2 suppliers for each plant, 2 suppliers across all the plants, incumbent supplier scenarios, scenario with optimum suppliers etc. The system through category workbench application recommends the best scenario for a user. In an alternate embodiment, a user can create a new scenario with new constraints.

In an embodiment, the present invention provides the autonomous sourcing method that includes bid optimization through analysis of constraints. In procurement industry, a buyer would like to procure a number of items across multiple suppliers who are willing to furnish them at different prices (bid price). The objective is to meet this demand, target quantity (number of units), for each such item across multiple suppliers with cheapest possible cost. However, not every supplier would be furnishing all the items required by the buyer, hence there will be a need to work with multiple suppliers. Further, there may be cases where a single supplier cannot guarantee to furnish the target quantity units for an item all by themselves, which is called as supplier max capacity for that item. All such real-world scenarios and conditions make the optimization problem very challenging to model and solve. In view of the same, the optimization method of the present invention includes solver variables that are determined by the data solver, some of them being intermediate variables and some output variables. The auto optimization by the system through a data solver and optimizer includes operating with mixed Integer and Non-Integer scripts to accomplish minimizing cost or maximizing savings and constraints.

In an example embodiment, the data solver and optimizer utilize the below variables:
 (1) Set of unique bids in the price sheet (B): Bid set
 (2) Set of unique suppliers with eligible bids in price sheet (S): Supplier set
 (3) Set of unique items in price sheet (I): Item set
 (4) Cost of item per unit (C0): Coefficient 0
 (5) Freight or other cost independent of number of units of item (C1): Coefficient 1
 (6) Target quantity of an item. Non-negative Integer (TQ): Target Quantity
 (7) The Internal Variables includes determination of Bid being selected or not. This variable is needed as the cost function has a freight cost term (BBV): Bid Boolean Var
 (8) Number of units supplied by supplier across all items. Non-negative Integer (SQV): Supplier Quantity Var. If a supplier is selected or not for solution (SBV): Supplier Boolean Var
 (9) The Output Variables include Quantity allocated to a bid. Non-negative Integer (QV): Quantity Var.

Vector Lengths:
BBV=|B|
QV=|B|
SQV=|S|
TQ=|I|
SBV=|S|

And cost function of a bid, uniquely identified by (item, supplier, cost) triplet by a supplier is given by $$\text{cost}_b = C0_b * QV_b + C1_b * BBV_b \quad (1)$$

The first term is variable cost which is proportional to number of units allocated while the second term is fixed cost which is independent of number of units. The bid Boolean flag (either 0 or 1) makes sure of such fixed cost is only counted only once towards total cost if the bid is selected towards allocation.

The optimization includes minimizing the following cost function f(x) which is the summation of above expression 1 for all the bids submitted to the bidding process.

$$f(x) = \sum_{b=1}^{|B|} (C0_b * QV_b + C1_b * BBV_b) \quad (2)$$

In an exemplary embodiment, the invention processes Constraints that are a set of conditions frequently requested by the procurement industry towards allocation of units to suppliers. These constraints are based on attributes of suppliers or items or bids. For example, preferred Suppliers vs non-preferred suppliers, incumbent vs non-incumbent suppliers, supplier categories based on other attributes, item categories, etc. are a few to name. The constrains are Implicit or Explicit constraints. Some of the other e.g., includes diversity status, contractual commitment of volumes/spend, and minimum number of suppliers to address risks.

The Implicit constraints are the set of constraints that are not created by the end user (from front end), but rather by the optimizer implicitly. These set of constraints are a mandatory set of conditions that must be satisfied towards the allocation of units to bids. The implicit constraints include target Quantity constraint, Supplier Boolean constraint, Bid Boolean constraint and Supplier quantity Var constraint.

Target Quantity Constraint
For every item the target quantity must be satisfied across suppliers' allocation for that item. There are I such constraints, one per item.

$$TQ_i = \sum_{b=1}^{|B_i|} (QV_b) \forall\, i \in I\ B_i \in B \quad (3)$$

where $B_i$=Bids belonging to Item i across all suppliers.

Supplier Boolean Constraint
This variable is used to control the number of suppliers being selected for allocation for all items. It identifies the supplier who is supplying at least one unit of any item across all items. Sometimes there is a requirement to limit the number of suppliers the buyer wants to work with in the procurement process. This variable is created one for each unique supplier.

$$SB_s = \begin{cases} 0 & 0 \le SQV_s \le 0.9 \\ 1 & 0.9 \le SQV_s \le \infty \end{cases} \forall\, s \in S$$

Bid Boolean Constraint
If quantity allocation for a bid is greater than 0 then bid Boolean is 1 for that bid or else zero. There are B such constraints. The fixed cost of a bid is added to the total procurement cost if the allocated quantity is at least one unit for that bid.

$$BBV_b = \begin{cases} 0 & 0 \le QV_b \le 0.9 \\ 1 & 0.9 \le QV_b \le \infty \end{cases} \forall\, b \in B$$

Supplier Quantity Var Constraint
Sum of quantities across all items for each supplier. There will be |S| such constraints; one for every supplier.
This constraint is needed create supplier Boolean constraint $$SQV_j = \sum_{i=1}^{|B_s|} (QV_i) \forall\, j \in S\ B_s \in B \quad (4)$$

where $B_s$=Bids belonging to supplier s across all items.
The Explicit Constraints are the set of constraints created by end user using product front end towards scenario creation. These are converted to mathematical expressions accordingly.

Supplier Subset Allocation Constraint
For a given subset items SI allocation happens only from subset bids SB of Subset Suppliers (SS) and not from all suppliers. Now the conditions:

$$QV_c = 0 \ \forall\, c \in CSB \quad (5)$$

$$\sum_{i=1}^{SBS} QV_{ij} = SQV_j \ \forall\, i \in SB_j \in SSB \quad (6)$$

$$\text{low} \le \sum_{j}^{SS} (SBV) \le \text{high} \quad (7)$$

Let all the bids from the complementary subset suppliers for the same item subset SI be called complementary subset bids CSB. The above sentence implicitly states that the quantity allocated to CSB is zero defined by condition (5).
Condition (7) is only set when either lower bound and/or upper bound is given. These bounds are applied and only a subset number of suppliers is selected from the given (SS) accordingly.

$$TQ_p = \sum_{j=1}^{B} (QV_b) \ \forall\, p \in SI\ B_p \in SB \quad (8)$$

The condition (8) overridden and replaces the condition (3) for all items in (SI)
Supplier Advantage/Disadvantage by Percentage
This condition is to provide either advantage or disadvantage to supplier across subset items by either decreasing or increasing respectively the coefficient 0 and coefficient 1 values in bids by a percentage value. This is a pre-processing step that manipulates the data rather than adding a mathematical constraint to the solver.

Supplier Advantage/Disadvantage by Value

This condition is to provide either advantage or disadvantage to supplier across subset items by either decreasing or increasing respectively the coefficient 0 and coefficient 1 values in bids by value. This is a pre-processing step that manipulates the data rather than adding a mathematical constraint to the solver. The true advantage/disadvantage value is only visible if the supplier is allocated the total value he bid for. Otherwise it is simply proportionate advantage/disadvantage.

Range Allocation

At times the Supplier Subset allocation constraint allocates an impractical allocation like for example: in allocating 100 units of target quantity 99 units are allocated to supplier 'A' and only 1 unit to supplier 'B', mathematically this might be correct, but very impractical. For a given subset bid ids, group by bids on supplier ids, and avoid allocation between 0-lower bound and between upper bound and max allocation. (only allow allocation between lower bound, upper bound)

To avoid such situations the following two constraints are written down, one by value percentage and other by number of units (volume) where there is lower and/or upper bound to each allocated supplier. Hence, either the supplier is allocated zero units/zero percentage value, or something between the ranges mentioned in this constraint.

Range Allocation Value Percentage $$D = \sum_{b=1}^{B}(C0_b * QV_b + C1_b * BBV_b \; \forall \; b \in SB \quad (9)$$

where SB is subset bids of dataset.

$$C_b = C0_b * QV_b + C1b * BBV_b \forall b \in SB \quad (10)$$

where SB is subset bids of dataset, and there will be |SB| such constraints added to the problem.

$$BBV_b * (\text{low} * D - C_b) <= 0 \forall b \in SB \quad (11)$$

where SB is subset bids of dataset, and there will be |SB| such constraints added to the problem.

$$C_b - \text{high} * D <= 0 \forall b \in SB \quad (12)$$

where low and high are lower and upper bounds in percentage allocation of value, and SB is subset bids of dataset, and there will be |SB| such constraints added to such. Range allocation volume $$BBV_b * (\text{low} - QV_b) <= 0)) \forall b \in SB \quad (13)$$

where SB is subset bids of dataset, and there will be |SB| such constraints added to the problem.

$$QV_b - \text{high} <= 0 \forall b \in SB \quad (14)$$

where low and high are lower and upper bound of allocation of number of units for every bid and SB is subset bids of dataset, and there will be |SB| such constraints added to the problem.

In an embodiment, the method of autonomous sourcing includes supplier recommendation. The supplier recommendations are generated by the automated systems through the bot and AI engine. When a user wants supplier recommendations at a category, region, business unit level, the System first auto-generates a price sheet with target prices, constraints (region of supplier, min volumes etc.). The price sheet may have several line item descriptions that are textual. Since, textual descriptions are difficult to understand/comprehend and there are no direct mappings between items and suppliers that are maintained in ERP systems or databases, there are no relations between items and the categories.

In an exemplary embodiment, the present invention collates and scrubs data from one or more internal and external databases including ERPs, Vendor Management Systems, Newsfeeds from top Industry Sources, Market Indices, Demand Management and Inventory Management Systems for data analysis to predict spend.

The AI engine is configured for processing data based on plurality of attributes/criteria including but not limited to Spend data across different organizations for each category, Total spend for each category for each organization, Number of organizations served by the supplier, Coverage: Number of items in each category catered for each supplier, Firmographic attributes: Total Revenue, profits, number of employees, regions operating in, contact information (emails, Phone number, Key people), diversity status etc., Supplier Rating as rated by organizations in that industry, Activity like Number of bids/auctions invited, awarded to, Supplier Risk rating and number of transactions etc.

Figure 3A:
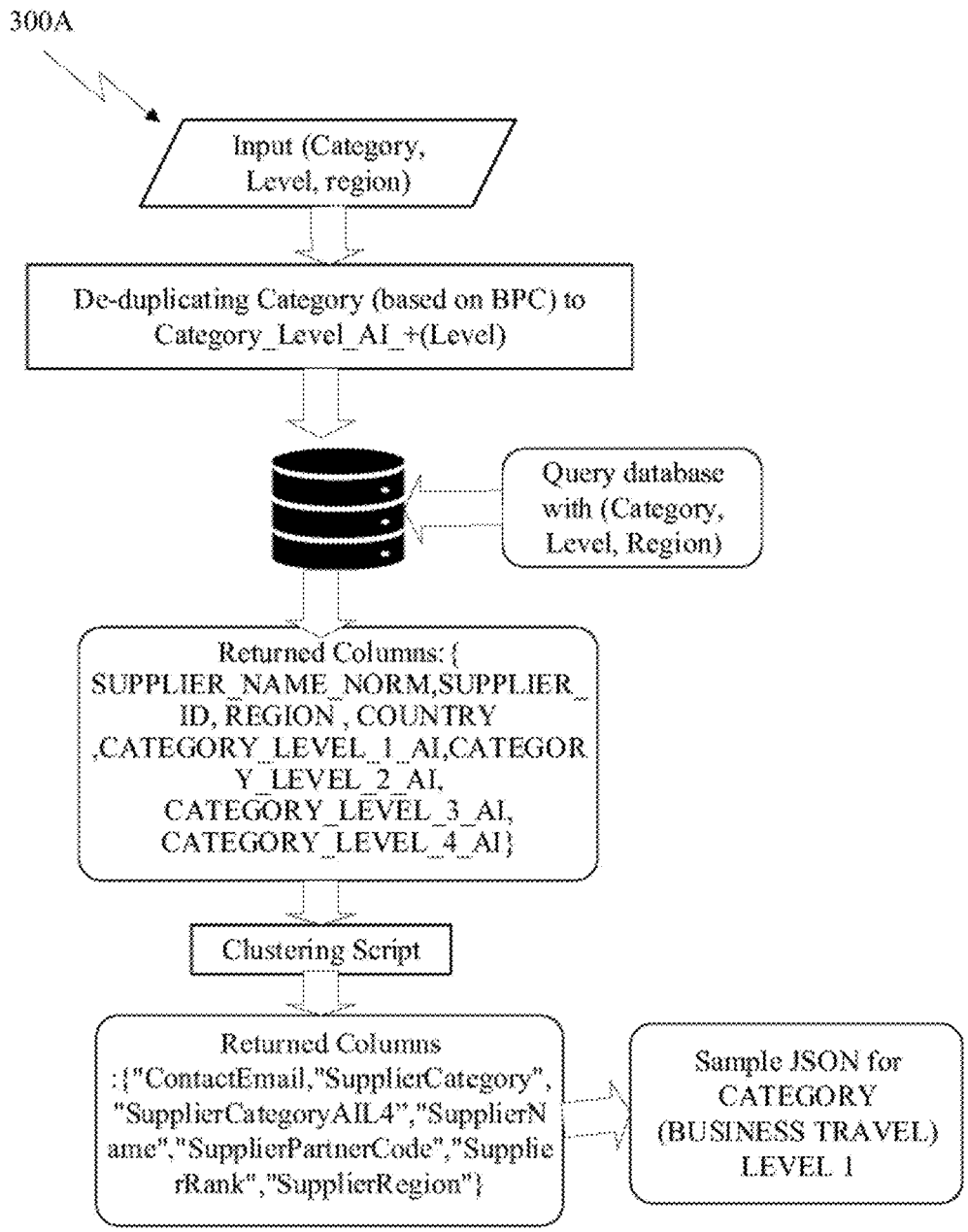
FIG. 3A is a flow diagram depicting a method of supplier recommendation in an example scenario in accordance with an embodiment of the invention.

Referring to FIG. 3A a flow diagram 300A for supplier recommendation in an example scenario is provided in accordance with an embodiment of the invention. In the example scenario for Category, Level, Region the category of BUSINESS TRAVEL and Level1 is depicted in the diagram 300A.

In such a scenario, a supplier Score (S) is determined as:

Score for a Supplier $S = W_1 \cdot X_1 + W2 X2 + W3 \cdot X3 + W4 \cdot X4 + W5 \cdot X5 + \ldots + Wn Xn$ i.e.

$$Si = \sum_{i}^{n} \sum WiXi$$

Where Si is the score of the supplier, Wi=Weights of the supplier on the attribute Xi, Xi is the attributes or the criteria. Xi is normalized using a scaler.

$$Zi = \frac{Xi - \mu i}{\sigma i}$$

Where $\mu i$ is the normal central tendency (Mean/Average in this case) and $\sigma i$ is the standard deviation of the distribution of that attribute.

The sum of all Weights $\Sigma_{i=1}^{n}$ Wi=1 and $0 <= Wi <= 1.0$

The weights Wi are initially assigned to be equally distributed unless stated in the RFx application. The weights specified through the user interface are fetched by the AI engine.

On user Feedback, the overall supplier score is given either a reward or a penalty based on whether the supplier has been selected for a next round.

$Score_{new} = Score_{old} + \Delta$ where $\Delta$ is a penalty or a reward, depending on the selection. This reward weight penalizes it to the extent that it ranks below the suppliers selected by the autonomous sourcing application. The Supplier score and ranking is shown in table 300B in FIG. 3B.

Figure 3C:
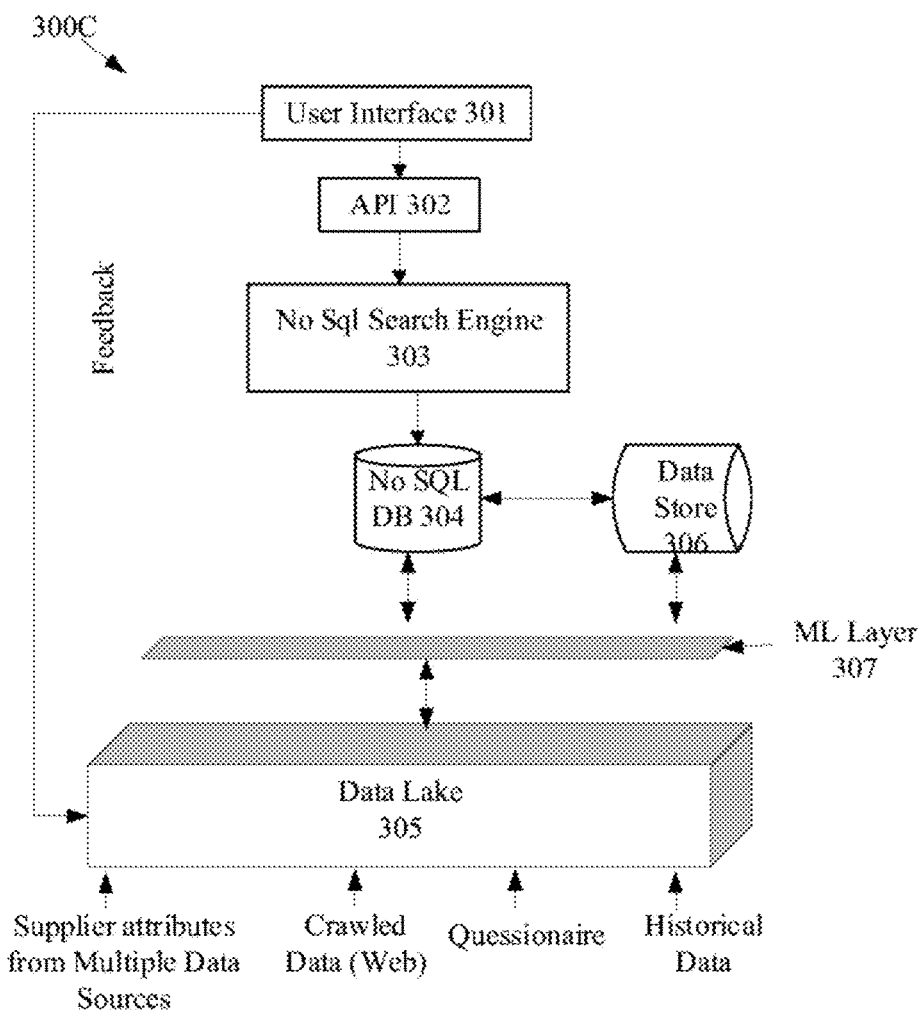
FIG. 3C is a system support architecture for a supplier recommendation in accordance with an embodiment of the invention.

Referring to FIG. 3C a system support architecture for a supplier recommendation is shown in accordance with an embodiment of the invention. The support architecture 300C includes category workbench user interface 301, API 302 for attribute and element extraction, No SQL search engine 303, No SQL Database 304 and the Data lake 305. The Data lake 305 provides a feedback on the category workbench 301 for recommending supplier. The data lake 305 receives information related to supplier attributes from multiple data sources, crawled data from web related to supplier profile or newsfeed, questionnaire and outcomes and historical spend data. The data from the data lake 305 is fetched and processed by the Processor based on a script created by the AI engine. The architecture includes a data store 306 providing data to the No SQL DB 304 and a machine learning ML Layer 307 above the data lake for processing the data. The AI engine coupled to the processor encoded with instructions enabling the processor to function as a bot for processing the data in the data lake by generating a code related to the script for supplier recommendation. Further, the system of the invention provides an AI based clustering script for mapping object (Item/Service) to Suppliers and Categories. The clustering script enables unsupervised object discovery. The support architecture for supplier recommendation includes fetching information from executed contracts. The architecture may further include convolutional neural network (CNN), data structuring block for data extraction and training models to perform text cleansing, tokenization, vectorization, string classification, NER extraction etc. The architecture enables performance of read/write extracted data attributes and data elements from the contract for training models and fetching pricing information and other required information associated with a supplier from contracts through the SCM application.

In an example embodiment, the system of the invention analyzes spend data patterns of an entity through classification of the spend data into a hierarchical taxonomy that provides insights into the spend patterns. The AI engine of the invention generates clusters from spend data across multiple entities to discover common items or services that are procured across multiple entities and suppliers. The AI engine processes the spend data through an unsupervised and nonparametric clustering approach as the number of possible clusters are unknown. The spend data is obtained from several data sources. Each data sample has several attributes obtained from different sources. These attributes are the supplier name, PO description, GL description, invoice description and materials descriptions as shown in Table 300D of FIG. 3D. The AI engine processes a concatenated description as input to the data model for item discovery. The spend data of multiple entities is consolidated into a unified hierarchical Spend taxonomy. This taxonomy has multiple levels and the granularity increases with each level. Examples of the label taxonomy are shown in Table 300E of FIG. 3E.

Figure 3F:
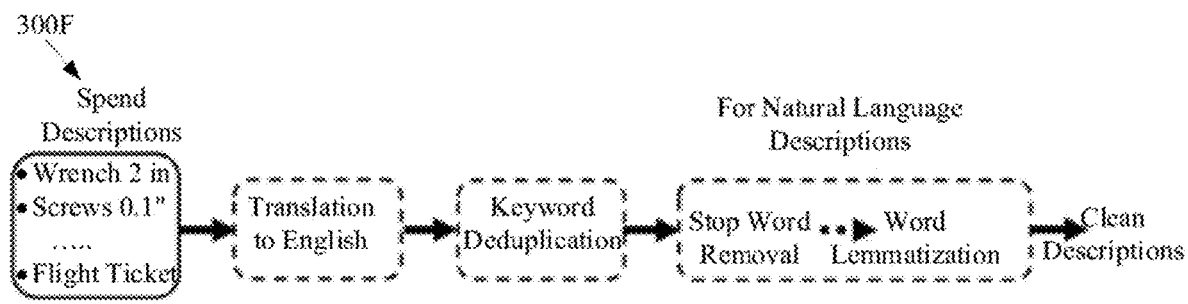
FIG. 3F shows an overview of preprocessing performed on data descriptions in accordance with an embodiment of the invention.

In another embodiment, several preprocessing steps are performed to clean and enrich the descriptions as the descriptions can be noisy and reduce the performance of a data classifier like a spend data classifier. Referring to FIG. 3F, an overview of the preprocessing performed on spend data descriptions is shown in block diagram 300F. The system caters to entities from all over the world and the descriptions may be in any language other than English, and translation to English is applied as a preliminary preprocessing step. There could be some instances where detailed natural text descriptions are provided. To handle these samples, a pipeline of preprocessing is performed where frequently occurring words such as "the, an" are removed and word lemmatization is performed which results in a description like other samples.

In an exemplary embodiment, a convolution neural network is used for classification that focuses on presence of keywords rather than sequence for feature extraction as spend description is a short text containing a series of keywords without grammatical structure. One-dimensional convolutions are performed on the sequence of word embedding vectors provided as inputs. Each convolution operation is referred to as a filter h and has a filter width w. The one-dimensional convolution operation for a word sequence f is given by:

$$(f*h)(m) = \sum_{i=0}^{w} h[i]f[m-i]$$

Figure 3G:
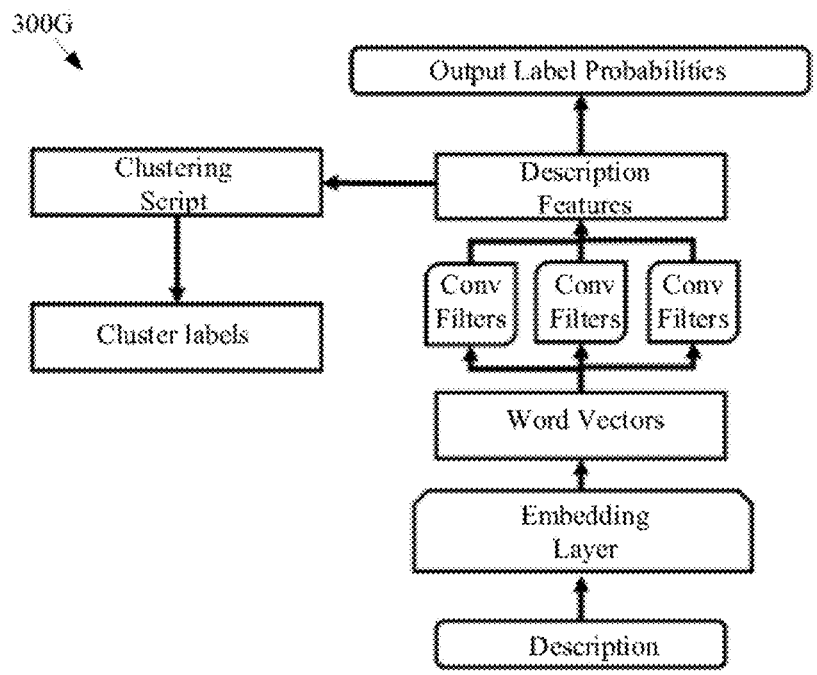
FIG. 3G is a block diagram showing different components of a data classifier in accordance with an embodiment of the invention.

Three different window widths with plurality of filters (eg: 128 filters) for each window width are used. This ensures filters learn for different n-grams in a training dataset. The model output is a Softmax layer with a size equal to the number of categories present. The block diagram providing different components of the data classifier are shown in FIG. 3G. The categorical cross entropy (CE) loss function is used for computing the gradients for training the network.

Figure 3H:
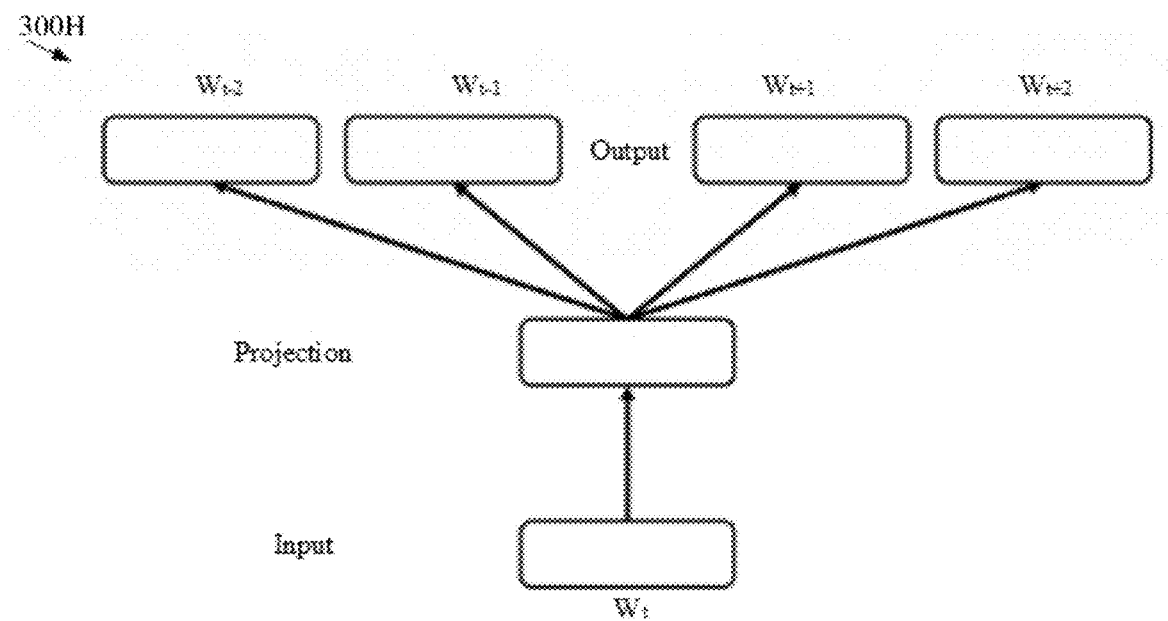
FIG. 3H is a skip-gram model of word embedding in accordance with an embodiment of the invention.

Referring to FIG. 3H, provides a skip-gram model 300H of word embeddings in accordance with an example embodiment of the invention. The semantic relationship of words is encoded in the embedding space in the form of similar vectors. The word embeddings are trained using the skip gram model where the current word embedding is used to predict the word embedding of the surrounding context. The extraction of Words is followed by several downstream tasks that rely on the use of Natural Language Processing (NLP) with deep learning algorithms. A word or token is an atomic unit in text processing, and it is mapped to a feature space that captures its semantic and syntactic meaning. This achieved by training word embeddings where each word is mapped to a vector of dimension D. This D-dimensional embedding space captures the relationship between different words in the vocabulary. The word embeddings are trained using the fast text framework that relies on the skip-gram model 300H. The word embedding of a token is mapped through a transformation to predict the word embedding vectors of its surrounding tokens:

$$\mathcal{L}_{skip-gram} = \sum_{n=0}^{N} \sum_{c \in C_n} \log(p(w_c | w_n))$$

where $L_{skip-gram}$ is the loss function used to train the word embeddings, context $C_n$ with words we is the set of indices for words surrounding the target word wn. Fast-text also models each word by using character n-grams. For the training of embeddings all n-grams are extracted for n>=3 and n<6. Each n-gram is associated with a vector $u_g$, leading to the following scoring function is:

$$s(w, C_w) = \sum_{g \in G_w} u_g^T v_{C_w}$$

where $G_w$ with n-grams g are the set of n-grams per word w, $C_w$ is the context for the word w. This is crucial to capture the subtle differences between words having either the same suffix or prefix. The vocabulary and training corpus for word embeddings is obtained by using the text present in the historical database. This is to ensure that the word embedding space is specific to object text i.e. it captures the grammatical structure and semantic meaning of words, sentences present in characteristic description of the object.

Figure 3I:
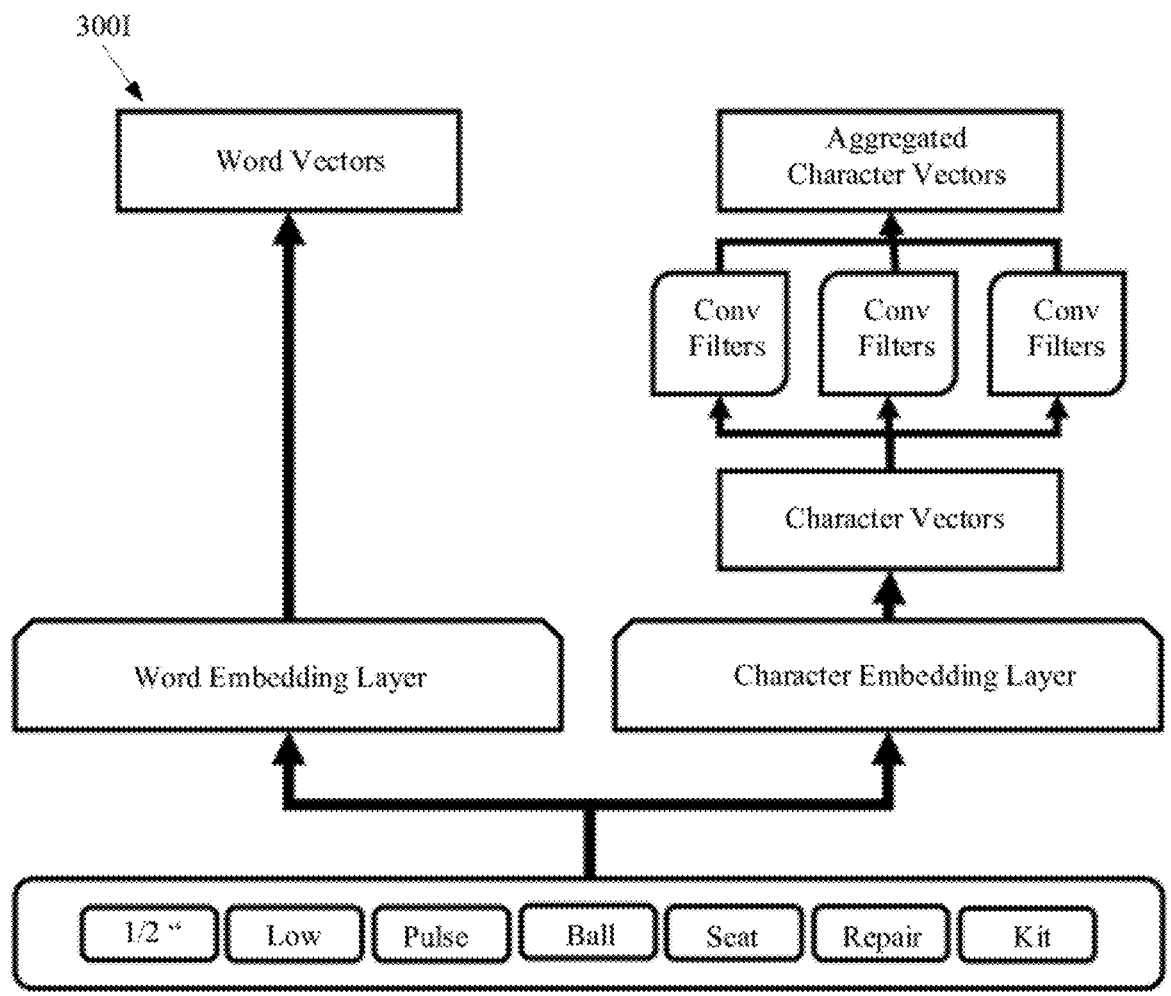
FIG. 3I is a block diagram showing concatenating words embedding with character embeddings in accordance with an embodiment of the invention.

Typical spend data descriptions can include several numeric attributes and industry specific keywords. These are encoded as out-of-vocabulary (OOV) w.r.t the word embeddings. However, such attributes could contain useful information for classification. For example, the numeric attribute of "16-inch" cannot belong to the Travel-expense category. Character embeddings are used to represent such OOV words where each character in the word is represented by a De dimensional vector and the vectors of all characters in a word are aggregated using a character level convolutional neural network (CNN). A block diagram 300I of concatenating word embeddings with character embeddings is shown in FIG. 3I. This aggregated character embedding $v_c$ is concatenated with the word embedding $v_w$, to represent in each word in the text description.

$$v:=[v_w, v_c]$$

In an exemplary embodiment, the unsupervised clustering of spend data is performed using the CNN models described earlier. The present invention trains a data classifier on each level 1 label with the normalized taxonomy used as the output in a supervised learning setting. This data classifier is also used as a feature encoder as the feature space learned by this classifier at the prefinal layer captures a separable space across items. To perform item discovery, all the data belonging to a level 1 label is encoded through its corresponding level 1 classifier. The resultant feature vectors capture the semantic meaning of the line item description.

In another exemplary embodiment, the present invention provides a nonparametric clustering method i.e. database scan (DB Scan) to be used on the feature vectors. Nonparametric clustering approach is used as the number of items that could be present can be unknown beforehand and it can also be a large number. The DB Scan is applied in a hierarchical fashion where the hypermeters for the algorithm are recursively tuned until all the clusters detected in the data are less than hundred line-items. The clustering approach is applied to the data per level 4 label (FIG. 3I). The level 4 label is most granular representation of categorization available through the data taxonomy. Further granularity can be achieved through the clustering approach. For example, clustering on a level 4 label of "Meals" could result in "Sandwiches", "Buffet Meals", "Doughnuts" etc.

Each extracted cluster contains a list of line items which could belong to multiple entities, multiple suppliers and forming a list of descriptions. A representative name for the cluster is obtained for the cluster by finding the most common subsequence of words in the list of descriptions. For items belonging to level 1 labels such as MRO (Maintenance, Repair and Operations), items could have multiple alpha-numeric attributes. A list of all possible alpha-numeric attributes are extracted from the detected cluster. For example, a cluster such as "Nuts" could have numeric attributes of "1 mm", "2 in", "3 in". A list of unique suppliers and entities that belong to this cluster are also collated. This meta-data for all extracted clusters could have several use cases such as Master Data Management, Supplier Recommendation etc.

One such potential application is supplier recommendation. For an entity that would like to procure a certain item, the item can be queried across all the detected clusters and the list of suppliers for the best match cluster could be retrieved. Further, these clusters could be represented in the form of a graph database where multiple criterion such as entity line of business and region of suppliers can also be used as additional filters to recommend the best possible list of suppliers.

Figure 3J:
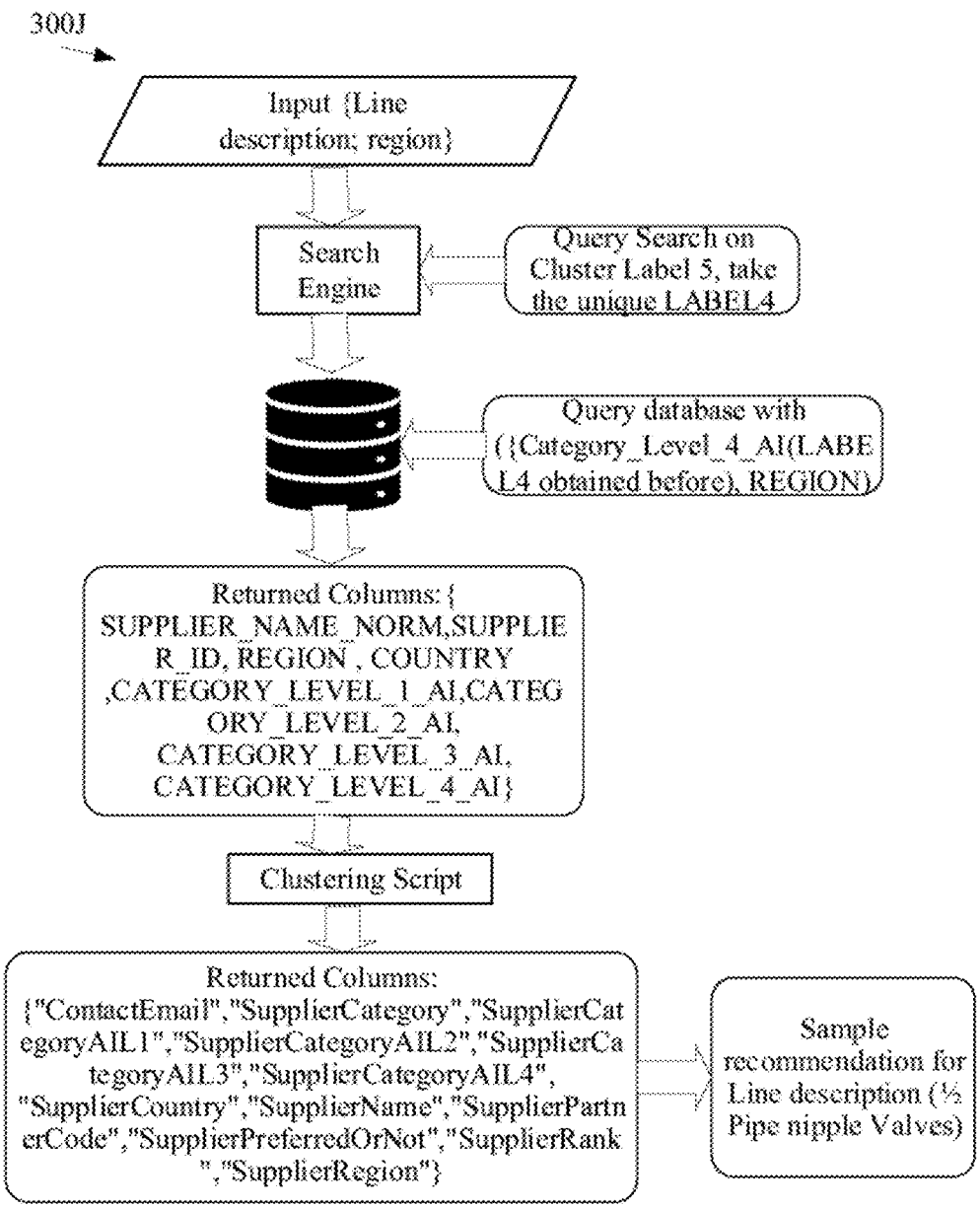
FIG. 3J is a flow diagram for supplier recommendation in example scenario with line description in accordance with an embodiment of the invention.

Referring to FIG. 3J, flow diagram 300J for supplier recommendation in another example scenario is provided in accordance with an embodiment of the invention. In the example scenario, a Line description in price sheets is provided where a search by the AI engine is performed for very quick and accurate results. For eg: "½ pipe nipple valves", Region.

In an example embodiment the system provides supplier recommendation as {"Recommended_Suppliers": [{"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "PIPE AND PIPE FITTINGS", "SupplierCountry": "UNITED STATES OF AMERICA", "SupplierName": "ABC INDUSTRIES INC", "SupplierPartnerCode": "None", "SupplierPreferredOrNot": null, "SupplierRank": "1", "SupplierRegion": "AMERICAS" }, {"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "PIPE AND PIPE FITTINGS", "SupplierCountry": "UNITED STATES OF AMERICA", "SupplierName": "XYZ AUTO PARTS", "SupplierPartnerCode": "None", "SupplierPreferredOrNot": null, "SupplierRank": "2", "SupplierRegion": "AMERICAS" }, {"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "PIPE AND PIPE FITTINGS", "SupplierCountry": "UNITED STATES OF AMERICA", "SupplierName": "WXY INDUSTRIAL TECHNOLOGIES INC", "SupplierPartnerCode": "None", "SupplierPreferredOrNot": null, "SupplierRank": "3", "SupplierRegion": "AMERICAS" }, {"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "PIPE AND PIPE FITTINGS", "SupplierCountry": "UNITED STATES OF AMERICA", "SupplierName": "XYZ CORP", "SupplierPartnerCode": "None", "SupplierPreferredOrNot": null, "SupplierRank": "4", "SupplierRegion": "AMERICAS" }, {"ContactEmail": "None", "SupplierCategory": "½ pipe nipple valves", "SupplierCategoryAILLI": "MRO", "SupplierCategoryAIL2": "MRO SUPPLIES", "SupplierCategoryAIL3": "PIPES, VALVES & FITTINGS", "SupplierCategoryAIL4": "PIPE AND PIPE FITTINGS", "SupplierCountry": "UNITED STATES OF AMERICA", "SupplierName": "ABC BATES CO", "SupplierPartnerCode": "None", "SupplierPreferredOrNot": null, "SupplierRank": "5", "SupplierRegion": "AMERICAS" }, {"ContactEmail": "None", "SupplierCategory": "½ pipe nipple valves", "SupplierCategoryAILL": "MRO", "SupplierCategoryAIL2": "MRO SUPPLIES", "SupplierCategoryAIL3": "PIPES, VALVES & FITTINGS", "SupplierCategoryAIL4": "CONTROL VALVES", "SupplierCountry": "UNITED STATES OF AMERICA", "SupplierName": "XYZ INC", "SupplierPartnerCode": "None", "SupplierPreferredOrNot": null, "SupplierRank": "6", "SupplierRegion": "AMERICAS"), {"ContactEmail": "None", "SupplierCategory": "½ pipe nipple valves", "SupplierCategoryAILL1": "MRO", "SupplierCategoryAIL2": "MRO SUPPLIES", "SupplierCategoryAIL3": "PIPES, VALVES & FITTINGS", "SupplierCategoryAIL4": "CONTROL VALVES", "SupplierCountry": "UNITED STATES OF AMERICA", "SupplierName": "ABC PERFORMANCE INC", "SupplierPartnerCode": "None", "SupplierPreferredOrNot": null, "SupplierRank": "7", "SupplierRegion": "AMERICAS" }, {"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "CONTROL VALVES", "SupplierCountry": "UNITED STATES OF AMERICA", "SupplierName": "XYZ PIPE AND SUPPLY CO", "SupplierPartnerCode": "None", "SupplierPreferredOrNot": null, "SupplierRank": "8", "SupplierRegion": "AMERICAS" }, {"ContactEmail": "None", "SupplierCategory": "½ pipe nipple valves", "SupplierCategoryAIL1": "MRO", "SupplierCategoryAIL2": "MRO SUPPLIES", "SupplierCategoryAIL3": "PIPES, VALVES & FITTINGS", "SupplierCategoryAIL4": "CONTROL VALVES", "SupplierCountry": "UNITED STATES OF AMERICA", "SupplierName": "WXY USA INC", "SupplierPartnerCode": "None", "SupplierPreferredOrNot": null, "SupplierRank": "9", "SupplierRegion": "AMERICAS" }, {"ContactEmail": "None", "SupplierCategory": "½ pipe nipple valves", "SupplierCategoryAILL": "MRO", "SupplierCategoryAIL2": "MRO SUPPLIES", "SupplierCategoryAIL3": "PIPES, VALVES & FITTINGS", "SupplierCategoryAIL4": "CONTROL VALVES", "SupplierCountry": "UNITED STATES OF AMERICA", "SupplierName": "XYZ CORP", "SupplierPartnerCode": "None", "SupplierPreferredOrNot": null, "SupplierRank": "10", "SupplierRegion": "AMERICAS")])

Referring to FIG. 3K, a table 300K depicting item to category mapping is shown according to an embodiment of the invention. The category mapping is performed through a bot by processing a clustering script to map item to category. Even in case of a new item not previously processed, the script is configured to identify characteristics associated with the item and map it to the category or create a new category by processing through the AI engine.

Figure 4:
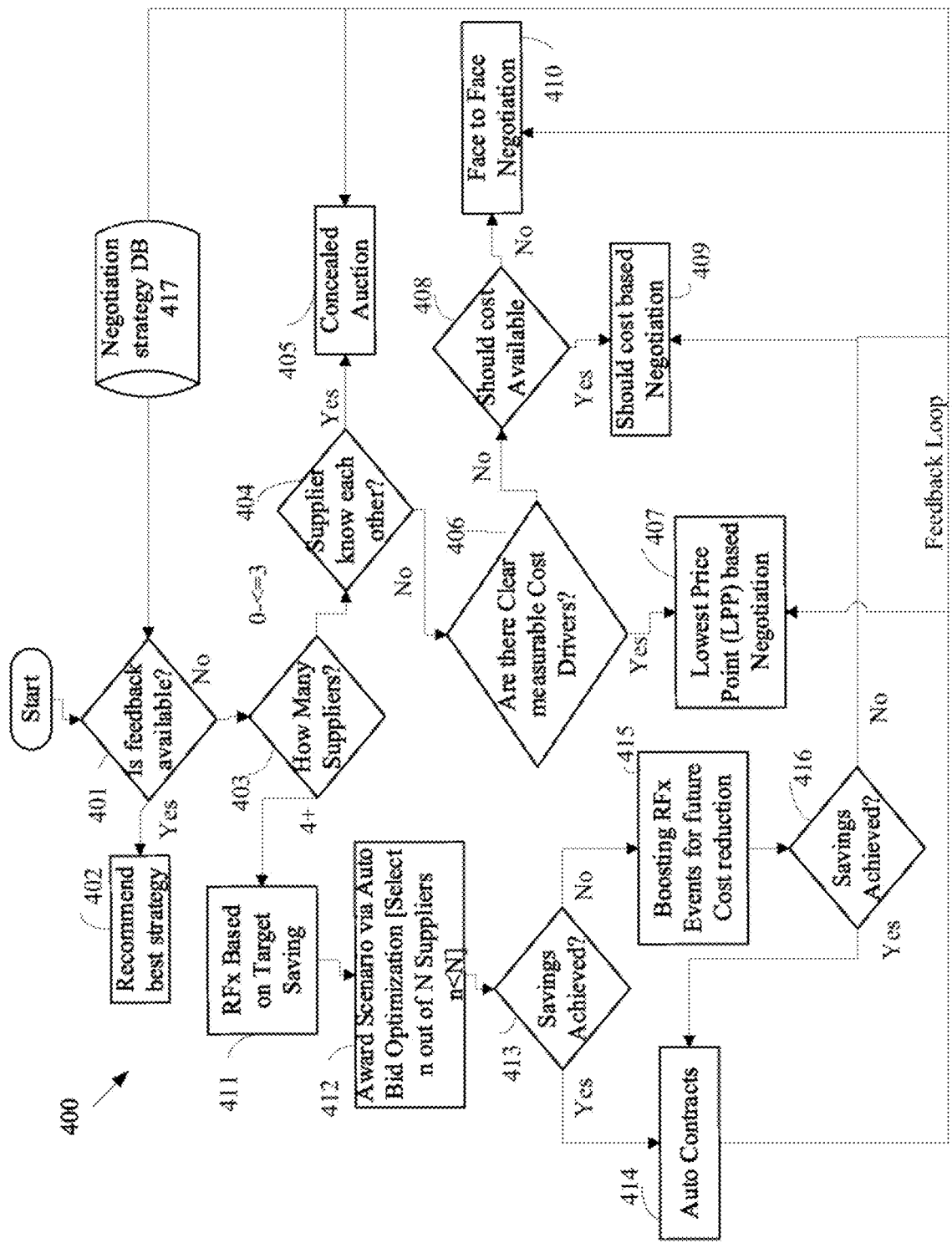
FIG. 4 is a flow diagram of a negotiation strategy executed by an auto-negotiator in accordance with an embodiment of the invention.

Referring to FIG. 4, a flow diagram 400 of a negotiation strategy executed by the auto-negotiator is shown in accordance with an example embodiment of the present invention. In an example embodiment, the auto negotiator in step 401 checks for availability of a feedback based on an input received, if it is available then in step 402 the best strategy is recommended as per the input. The System processes all historical negotiation data and strategies such as savings and turnaround time, along with current conditions such as market and rate predictions, to suggest the best strategy. If the feedback is not available, then in step 403 check how many suppliers are available for negotiation. If suppliers are less than or equal to 3 then in step 404 it is checked if the suppliers know each other, if they know each other then in step 405 a conceal auction is recommended. The concealed auction can be an auction like a concealed Dutch Auction. In concealed Dutch auction, the number and names of all competitors are concealed from participants. If the suppliers don't know each other then in step 406, it is checked with there are clear measurable cost drivers, if yes then in step 407 lowest Price point (LPP) based negotiation is recommended, else in step 408 it is checked if should cost is available. If should cost is available, then in step 409 should cost based negotiation is recommended, else in 410 face to face negotiation is conducted. In Should Cost negotiation, the negotiation is enabled based on information related to prevailing costs. If in step 403 it is determined that the number of suppliers are 4 or more then in step 411, RFx based on target saving is recommended and in step 412 award scenario is checked based on bid optimization. In step 413, it is checked if saving is achieved then in step 414, the auto creation of contract is initiated with the selected supplier. If saving is not achieved, then in step 415 boosting RFx events for future cost reduction. In step 416 it is checked if savings is achieved, if yes then auto creation of contact is initiated with the selected supplier else should cost based negotiation is recommended. The negotiations data is provided as a feedback to a negotiation strategy database 417 for conducting negotiations.

In an exemplary embodiment the auto-negotiator processes data scripts through the AI engine for predicting recommendation with logistic regression and median calculations. The data scripts adapt processing logic to each category enabling changing decision parameters and tool recommendations over time. The AI engine prediction caters to the possibilities of being selected by a user and average real savings. The recommendations predict one or more optimum negotiation approach (tender, auction, face to face etc.) and most effective negotiation levers/parameters (LPP, should cost, benchmarking).

In an embodiment the invention provides a recursive loop of performing continuous negotiation cycle with suppliers is derived from a probabilistic based data modelling configured to auto-set a target for an object and allowing a user to meet targets by lowering proposal to achieve maximum savings.

In an exemplary embodiment the present invention provides a category management system for supply chain operations. The category management system includes a plurality of task tools configured for triggering the at least one task based on a received demand from one or more data sources. The system also includes one or more trend indicators configured for providing the actionable insights to the user through the dashboard of the workbench application user interface. The actionable insights include category spend monitoring data, category classification and positioning data, supply market analysis data, supplier spend monitoring data, cost driver data, strategy data, opportunity identification data, risk assessment data. The system includes the AI engine coupled to the processor and configured for tracking and monitoring a plurality of parameters driving one or more supply chain operations. The plurality of parameters includes category strategies, key projects, supplier risk factors, contract performance indicator, and costs. The system analyzes trends including supply, demand and pricing trends in supply chain.

In one embodiment the category management system includes an organizer configured to generate a set of quantitative and qualitative data on the dashboard to analyze trends in supply chain. The quantitative data includes market indices, commodity prices, stock price of supplier, delivery turn-around time (TAT), changes in market shares, demand and supply forecasts, expected lead times, savings expectations and tracking, compliance, percentage of managed spend, benchmarks for spend and prices, and should cost models with cost evolution. The qualitative data includes newsfeeds, about innovation, litigation, Merger and Acquisition, spin-offs, bankruptcy, entry and exit of key executives, path breaking innovation, supply shocks, strategic changes.

In an exemplary embodiment the category management system includes a sub network having at least one server configured to process a plurality of backend scripts generated by the bot to identify a relevant script for a recommended strategy and a control unit configured to process the strategy based on the identified relevant script for automating at least one task. The control unit selects an Artificial Intelligence based dynamic processing logic using the bot to reduce the processing time of the task.

Figure 5A:
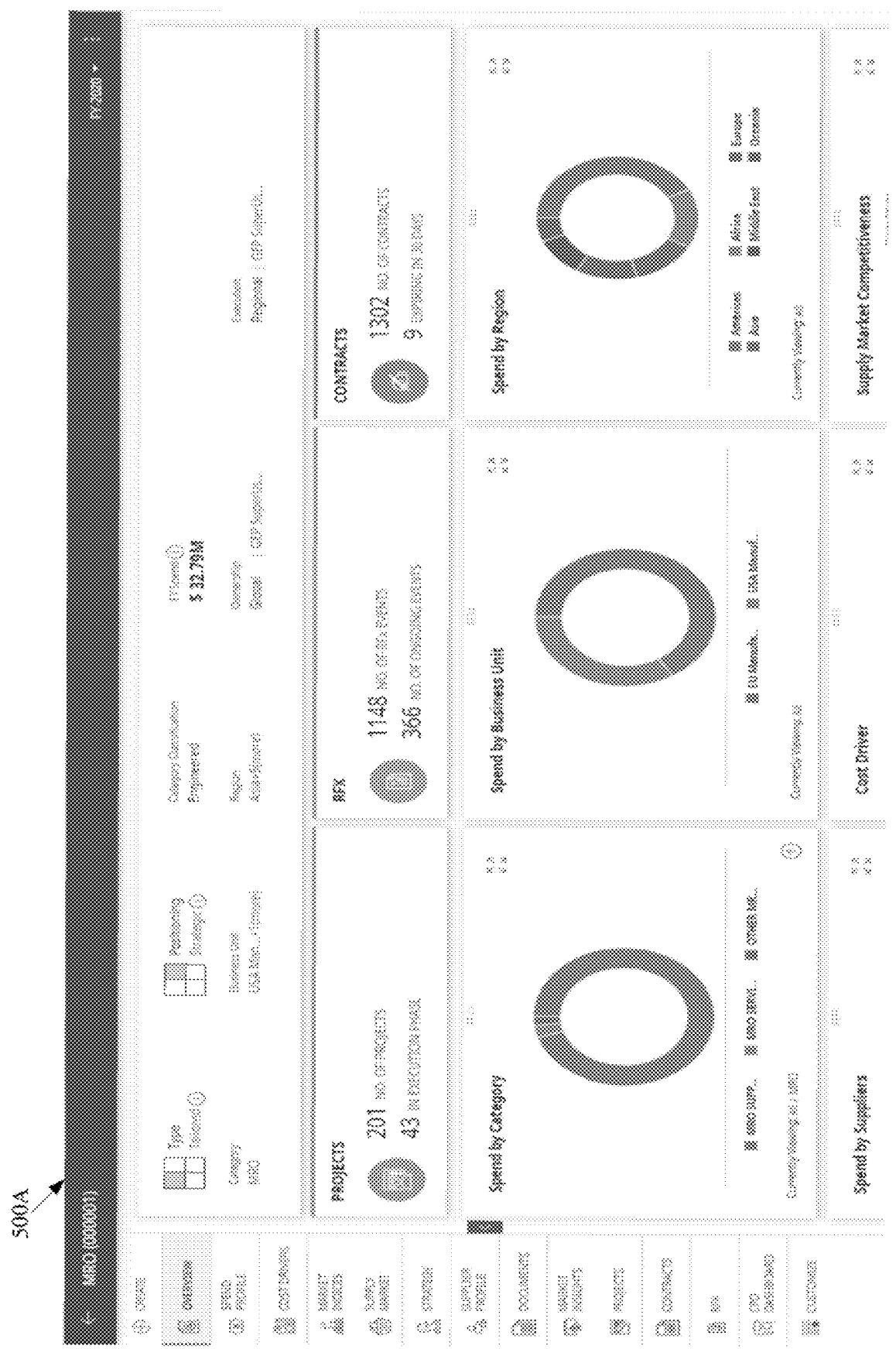
FIG. 5A shows a category workbench application user interface with actionable insights in accordance with an embodiment of the invention.
Figure 5B:
FIG. 5B shows a category workbench application user interface with details of spend profiles in accordance with an embodiment of the invention.

Referring to FIG. 5A-5H, a category workbench application user interface for autonomous sourcing and category management is shown in accordance with an embodiment of the invention. Based on a demand raised by an auto trigger such as expiring contract, or project module, or a requisition for sourcing through an entity team like HR team, marketing team or Plant maintenance team, a sourcing module is triggered through the category workbench user interface. The object for sourcing such as item or Services is assessed through user interface for should cost model, trends of raw material and price benchmarks of the objects. If the assessment through the workbench determines there are no significant cost saving and the supplier of the expiring contract is already the lowest price, then auto renewal of the contract is initiated. The contract is refrained automatically for latest clauses. If the assessment determines significant cost saving, then an autonomous sourcing process is triggered and monitored through the category workbench user interface. FIG. 5A shows an interface 500A, with actionable insights related to contracts, Projects, RFx, Category Spend, Business unit Spend, spend region, Supplier Spend, actual vs budgeted spend, top cost drivers, supplier competitiveness and Strategies on the same interface. FIG. 5B shows an interface 500B, with details of the spend profile including spend by category, spend by region, spend by business unit, spend by Payment terms, contracted Vs non-contracted spend by category and spend trends. The supplier profile includes information about top suppliers with supplier category spend, supplier region, business unit spend, payment terms spend.

Figure 5C:
FIG. 5C shows a category workbench application user interface with impact of certain parameters for executing sourcing operation in supply chain in accordance with an embodiment of the invention.

FIG. 5C shows an interface 500C, assessing supply market providing impact of certain parameters like impact of product, impact on business, impact on growth, level of spend, importance for function etc. These parameters are weighted and scored on the interface. The supply market interface assesses switching costs, impact of buyer, supplier, availability of substitutes, threat of new Entrants, competitive rivalry etc.

Figure 5D:
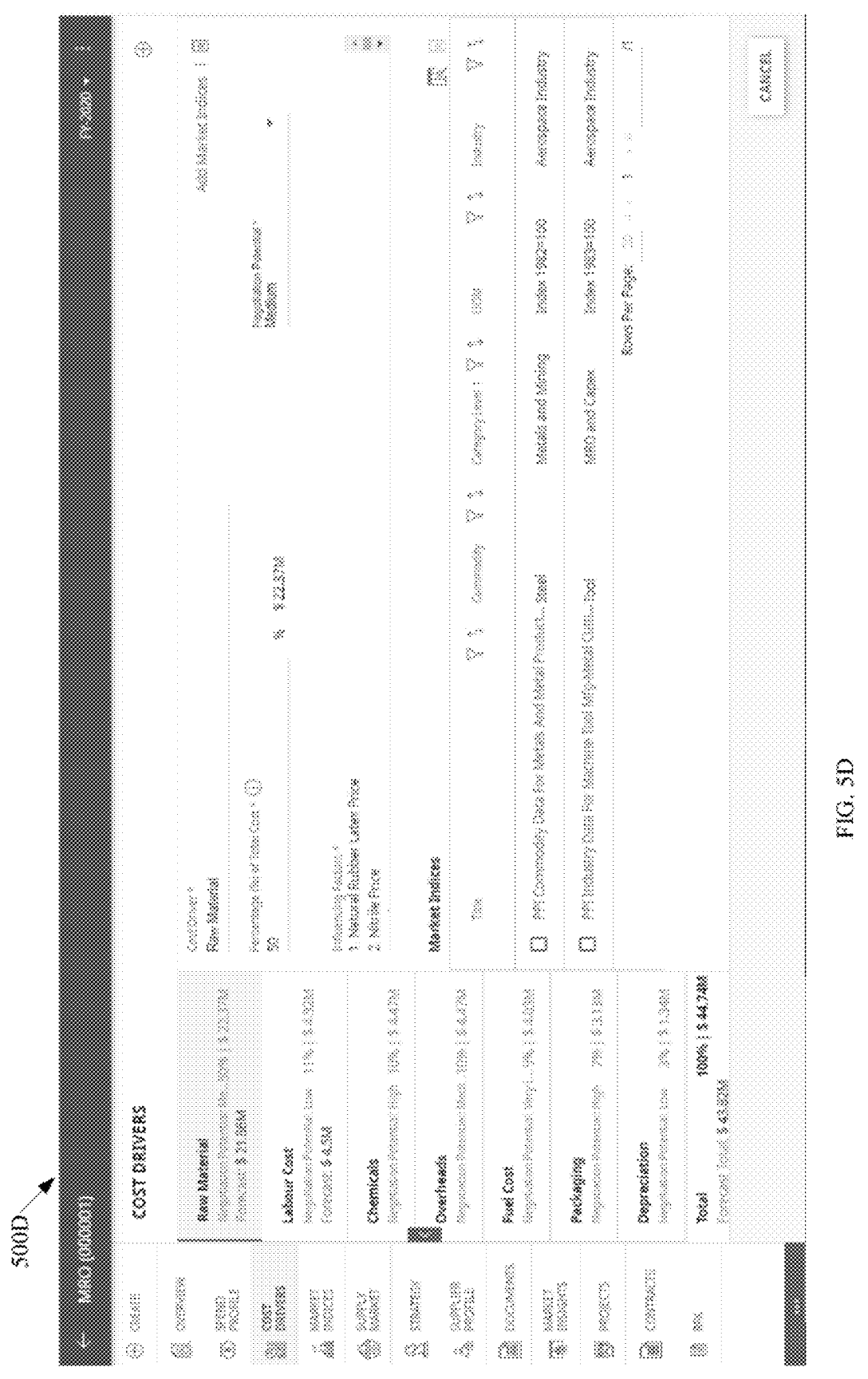

FIG. 5D shows an interface 500D, providing insight into cost drivers such as raw material, labor cost, Chemicals, fuel costs, packaging, depreciation, transport and other categories with probability of negotiation. The system is configured to assess the historical data with impact parameters associated with market indices to predict the probability score.

In an embodiment the category workbench interface provides forecast information related to objects such as forecasted price of oil from a region.

Figure 5E:
FIG. 5E shows category workbench application user interface with insights into market indices in accordance with an embodiment of the invention.

Referring to FIG. 5E, the category workbench interface 500E provides insight into market indices for items such as metal and metal products including iron and steel. Further, it also provides insight into coal, diesel, Aluminum, Paper, wages, Iron, Gold and silver at the same instant through graphical representations.

Figure 5F:
FIG. 5F shows category workbench application user interface with insights into strategy in accordance with an embodiment of the invention.
Figure 5G:
FIG. 5G shows category workbench application user interface with overview of Projects in accordance with an embodiment of the invention.

Referring to FIG. 5F, a category workbench user interface 500F providing insight into strategy is shown in accordance with an embodiment of the invention. The strategy includes sourcing strategy, Optimization, demand management, make vs buy, demand reduction, leakage management, consumption policy, Supplier acquisition, Socio-political management etc. The strategy provides insight into addressable spend, savings potential, ease of implementation and execution timelines, Potential benefits. Based on the identified strategy the interface enables flip to project with ease. The projects overview on the interface 500G is shown in FIG. 5G. The user interface also provides insight into supplier profile with collated data across multiple parameters for enabling ease in decision. The interface also provides reporting information on the dashboard with Product roadmap and details of Project reports, spend analysis report, contract details, savings across category, spend, region, etc.

Figure 5H:
FIG. 5H shows category workbench application user interface with insights into spend and savings in accordance with an embodiment of the invention.

Referring to FIG. 5H, a category workbench application user interface 500H showing spend and saving insight is provided in accordance with an embodiment of the invention. The interface at the same instant provides information about category spend, managed spend, targeted savings, related documents, category positioning and spend with impact, spend by supplier segment etc. The user interface further provides insight into target savings and ease of implementation for category such as IT, MRO, marketing etc. The target savings and ease of implementation insight also provides spend consolidation, Contract renegotiation, SKU rationalization and logistics optimization overview.

In an exemplary embodiment, the category workbench application user interface may enable cognitive computing to improve interaction between a user and the supply chain application(s). The intelligent interface provides insight into dynamically changing parameters such as key information obtained from live newsfeeds. The AI engine processes the newsfeed to draw relevance from the content and provide actionable insight to a user. Alternately, the system is configured to assign weights to type of news feeds and impact of certain news on supply chain to auto rate the scenario and modify the sourcing strategy or supplier recommendation for executing the recommended strategy. The AI engine processes the newsfeed based on a data script configured for understanding the content and relating it to impact characteristics in real time. For Eg., if the supplier is involved in certain type of litigation in a Jurisdiction which may impact the execution of strategy, then the AI engine shall automatically exclude the supplier from the recommended suppliers list depending on the parameters preferred by a user. The live news feed providing such information is extremely useful in ensuring risk free sourcing process for an entity. Further, in an advantageous aspect, the cognitive aspect of the invention enables a category manager to override an auto assessment by the AI engine if required.

In an exemplary embodiment, the present invention may be a system, a method, and/or a computer program product. The computer program product may include a computer readable storage medium (or media) having computer readable program instructions thereon for causing a processor to carry out aspects of the present invention. The media has embodied therein, for instance, computer readable program code (instructions) to provide and facilitate the capabilities of the present disclosure. The article of manufacture (computer program product) can be included as a part of a computer system/computing device or as a separate product.

The computer readable storage medium can retain and store instructions for use by an instruction execution device i.e. it can be a tangible device. The computer readable storage medium may be, for example, but is not limited to, an electromagnetic storage device, an electronic storage device, an optical storage device, a semiconductor storage device, a magnetic storage device, or any suitable combination of the foregoing. A non-exhaustive list of more specific examples of the computer readable storage medium includes the following: a hard disk, a random access memory (RAM), a portable computer diskette, a read-only memory (ROM), a portable compact disc read-only memory (CD-ROM), an erasable programmable read-only memory (EPROM or Flash memory), a digital versatile disk (DVD), a static random access memory (SRAM), a floppy disk, a memory stick, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the internet, a local area network (LAN), a wide area network (WAN) and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that which falls within the scope of the appended claims.

What is claimed is:

1. A method of Sourcing, the method comprising:
receiving a demand from at least one data source;
triggering a sourcing module through a category workbench application user interface for initiating at least one sourcing task based on the received demand;
in response to initiation of the at least one sourcing task, processing by an Artificial Intelligence (AI) engine coupled to a processor, a plurality of historical data from a data lake based on one or more data models to generate code for a recommended sourcing strategy through prediction analysis;
executing the code to inject by an intelligent bot, aggregated data patterns related to one or more object categories into the recommended sourcing strategy for generating at least one object characteristic data set;
identifying one or more suppliers for executing the recommended sourcing strategy based on the object characteristic data set; and
encapsulating one or more recommended awarding scenario on the category workbench user interface for selection to execute a sourcing operation, wherein the sourcing operation includes execution of the recommended sourcing strategy by the one or more suppliers.

2. The method of claim 1 wherein the step of identifying one or more suppliers include receiving a response to a questionnaire based on the object characteristic data set from one or more recommended suppliers wherein the questionnaire is generated by the Artificial Intelligence (AI) engine configured to process a historical query knowledge database based on a plurality of parameters and the object characteristic data set.

3. The method of claim 2 further comprises the step of injecting by a bot, one or more impact parameters capable of modifying at least one of the actionable insights, the recommended sourcing strategy, the data patterns or the awarding scenario.

4. The method of claim 2 further comprises
retrieving one or more recommended suppliers from a supplier database based on a plurality of factors including financial performance and risk ratings, revenue details, financial stability, spend data, client servicing, logistics, lead times, market fragmentation, capacity constraints, certifications, incumbent status, currency fluctuations and political risks.

5. The method of claim 4 wherein the Artificial Intelligence (AI) engine makes a supplier recommendation based on a supplier score (Si) determined by:

score for a Supplier $S = W_1 \cdot X_1 + W2X2 + W3 \cdot X3 + W4 \cdot X4 + W5 \cdot X5 + \ldots + WnXn$ i.e.

$$Si = \sum_{i}^{n} \sum WiXi$$

where Si is the score of the supplier,
Wi=Weights of the supplier on attribute Xi,
Xi is the attributes or the criteria
Xi is normalized using a scaler Zi as:

$$Zi = \frac{Xi - \mu i}{\sigma i}$$

where μi is the normal central tendency (Mean/Average in this case) and σi is the standard deviation of the distribution of that attribute.

6. The method of claim 2 wherein supplier identification includes evaluation of parameters associated with at least one of supplier management operations, procurement operations, inventory management operations, account payable operations, transportation management operations, and material management operations.

7. The method of claim 1 further comprises:
recommending a negotiation sourcing strategy through an auto-negotiator based on a negotiation script generated by the Artificial Intelligence (AI) engine wherein the awarding scenario is encapsulated based on execution of the negotiation sourcing strategy.

8. The method of claim 7 wherein a recursive loop of performing continuous negotiation cycle with suppliers is derived from a probabilistic based data modelling configured to auto-set a target for an object and allowing a user to meet targets by lowering proposal to achieve maximum savings.

9. The method of claim 8 wherein the negotiation script is generated by the AI engine coupled to the processor configured to process information about suppliers, pricing, budget, market and bids wherein the negotiation script drives conversations with suppliers for negotiation.

10. The method of claim 7 wherein the negotiation script is generated based on one or more negotiation data models trained through natural language processing (NLP) of a historical dataset with logistic regression and median calculations to predict recommendations.

11. The method of claim 10 wherein the recommendations predict one or more optimum negotiation approach and most effective negotiation parameters.

12. The method of claim 1 further comprises
determining a set of constraints associated with awarding of contract to one or more suppliers wherein the constraints are implicit or explicit constraints based on attributes associated with suppliers, or one or more objects or a bid.

13. The method of claim 12 further comprises creation of implicit constraints including target quantity constraint, supplier Boolean constraint, bid Boolean constraint and supplier quantity variable constraint.

14. The method of claim 13 further comprises creation of the explicit constraints including Supplier Subset allocation constraint, supplier advantage/disadvantage by percentage, Supplier advantage/disadvantage by Value and supplier range allocation.

15. The method of claim 1 further comprises the step of auto optimization through a data solver and optimizer configured for operating with mixed Integer and Non-Integer scripts to accomplish minimizing cost or maximizing savings and constraints.

16. The method of claim 1 further comprises the step of auto contract creation with legal and commercial terms and conditions based on the selected awarding scenario.

17. The method of claim 1 further comprises the step of analyzing historical data through the workbench application interface and perform Artificial Intelligence (AI) based budget predictions and demand aggregation by overlaying a historical spend data with disparate forecasting models built on various data sources available to analyze spend and pricing trends.

18. The method of claim 17 further comprises collating and scrubbing data from one or more internal and external databases including ERPs, Vendor Management Systems, Newsfeeds from top Industry Sources, Market Indices, Demand Management and Inventory Management Systems for data analysis to predict spend.

19. The method of claim 1 wherein the recommended sourcing strategy is determined based on data points including evaluation of operational objectives, total Cost of Ownership and lifecycle, engagement and pricing models, compliance levels, analysis of historical policies and strategies, consumption patterns, behaviour and performance data, opportunities for consolidation of volumes across geographies, business units, product and service categories, volume tier discounts, new technologies, substitute products, low cost alternatives, standardization or reuse opportunities, benchmarks for resource qualifications and experience, intervals for price negotiations, futures, forwards, and options to fix or cap prices of commodity purchases in liquid markets, currency hedging for materials which are predominantly imported, Value chain for opportunities for Vertical integration, Should cost by leveraging data model to negotiate on billing rates, material and equipment price, supplier mark-up/profit, and current inventory management practices.

20. The method of claim 1 wherein the category workbench application interface triggers a plurality of predictive data models to identify one or more category of objects eligible for sourcing.

21. The method of claim 1 wherein the bot is configured to generate backend scripts based on the recommended sourcing strategy for injecting the aggregated data using Artificial Intelligence (AI) based dynamic processing logic to generate the object characteristic data set.

22. A computer program product for sourcing in supply chain management application of a computing device with memory, the product comprising:
a computer readable storage medium readable by a processor and storing instructions for execution by the processor for performing a sourcing method, the method comprises:
receiving a demand from at least one data source;
triggering a sourcing module through a category workbench application user interface for initiating at least one sourcing task based on the received demand;
in response to initiation of the at least one sourcing task, processing by an Artificial Intelligence (AI) engine coupled to a processor, a plurality of historical data from a data lake based on one or more data models to generate code for a recommended sourcing strategy through prediction analysis;
executing the code to inject by an intelligent bot, aggregated data patterns related to one or more object categories into the recommended strategy for generating at least one object characteristic data set;
identifying one or more suppliers for executing the recommended sourcing strategy based on the object characteristic data set; and
encapsulating one or more recommended awarding scenario on the category workbench user interface for selection to execute a sourcing operation, wherein the sourcing operation includes execution of the recommended sourcing strategy by the one or more suppliers.

23. A System for Sourcing, the system comprising:
a category workbench application user interface configured for triggering a sourcing module to initiate at least one sourcing task based on a received demand from at least one data source;
an Artificial Intelligence (AI) engine coupled to a processor and configured for processing, in response to initiation of at least one sourcing task, a plurality of historical data from a data lake based on one or more data models to generate code for a recommended sourcing strategy through prediction analysis;
a data model database for storing one or more data models configured for generating the recommended sourcing strategy through prediction analysis and aggregated data patterns related to one or more object categories; and
a controller encoded with instructions enabling the controller to function as a bot for executing the code to inject the data patterns into the recommended sourcing strategy for generating at least one object characteristic data set,
wherein the processor is configured to process the object characteristic data set to identify one or more suppliers for executing the recommended sourcing strategy, wherein one or more recommended awarding scenario is encapsulated on the category workbench application user interface by the bot for selection to execute a sourcing operation, wherein the sourcing operation includes execution of the recommended sourcing strategy by the one or more suppliers.

24. The system of claim 23 further comprises:

a historical query knowledge database configured for storing a plurality of questions processed by the AI engine based on a plurality of parameters and the object characteristic data set to generate a questionnaire wherein one or more suppliers are identified based on a response to the questionnaire received from one or more recommended supplier.

25. The system of claim 24 further comprises:

a real-time updated impact parameter database configured for storing one or more impact parameters capable of modifying at least one of the actionable insights, the recommended sourcing strategy, the data patterns or the awarding scenario.

26. The system of claim 24 further comprises a supplier database configured to store data of the one or more suppliers recommended by the Artificial Intelligence (AI) engine for responding to the questionnaire, wherein the suppliers are identified based on a plurality of factors including financial performance and risk ratings, revenue details, financial stability, spend data, client servicing, logistics, lead times, market fragmentation, capacity constraints, certifications, incumbent status, currency fluctuations and political risks.

27. The claim of claim 26 wherein the Artificial Intelligence (AI) engine makes a supplier recommendation based on a supplier score (Si) determined by:

score for a Supplier $S = W_1 \cdot X_1 + W2X2 + W3 \cdot X3 + W4 \cdot X4 + W5 \cdot X5 + \ldots + WnXn$ i.e.

$$Si = \sum_{i}^{n} \sum WiXi$$

where Si is the score of the supplier,
Wi=Weights of the supplier on attribute Xi,
Xi is the attributes or the criteria, Xi is normalized using a scaler Zi as:

$$Zi = \frac{Xi - \mu i}{\sigma i}$$

where $\mu i$ is the normal central tendency (Mean/Average) and $\sigma i$ is the standard deviation of the distribution of that attribute.

28. The system of claim 23 further comprises a data solver and optimizer configured for operating with mixed Integer and Non-Integer scripts to accomplish minimizing cost or maximizing savings and constraints.

29. The system of claim 28 further comprises an Artificial Intelligence (AI) based clustering script for mapping objects to Suppliers and Categories wherein the clustering script enables unsupervised object discovery.

30. The system of claim 23 wherein the data sources include expiring contracts, blanket pay orders, should cost models built on market indices and prices, transactional spend data, demand planning, ERPs, budgets, supply planning, newsfeeds, Merger and Acquisition information, bankruptcy, innovation and spin-offs.

31. The system of claim 23 wherein the object characteristic data set is item or service pricing and item or service specification data.

32. The system of claim 23 further comprises a front-end web server communicatively coupled to at least one database server, wherein the front-end web server is configured to process the recommended sourcing strategy based on a plurality of scripts by receiving the recommended sourcing strategy processed by the server and applying an Artificial Intelligence (AI) based dynamic processing logic to the sourcing strategy to automate at least one sourcing task.

* * * * *